(12) United States Patent
Wang et al.

(10) Patent No.: US 7,407,726 B2
(45) Date of Patent: *Aug. 5, 2008

(54) PRIMARY ALKALINE BATTERY CONTAINING BISMUTH METAL OXIDE

(75) Inventors: Xiandong Wang, Acton, MA (US); Paul A. Christian, Norton, MA (US)

(73) Assignee: The Gillette Company, Boston, MA (US)

( * ) Notice: Subject to any disclaimer, the term of this patent is extended or adjusted under 35 U.S.C. 154(b) by 229 days.

This patent is subject to a terminal disclaimer.

(21) Appl. No.: 10/716,358

(22) Filed: Nov. 17, 2003

(65) Prior Publication Data

US 2005/0058902 A1 Mar. 17, 2005

Related U.S. Application Data

(60) Provisional application No. 60/503,667, filed on Sep. 16, 2003.

(51) Int. Cl.
*H01M 4/36* (2006.01)

(52) U.S. Cl. .............................. 429/231.95; 429/218.1; 429/220

(58) Field of Classification Search ............ 429/231.95, 429/218.1, 224, 231.5, 231.8, 219, 223, 229, 429/231.6, 231.9, 220
See application file for complete search history.

(56) References Cited

U.S. PATENT DOCUMENTS

| | | |
|---|---|---|
| 2,828,350 A | 3/1958 | Rhyne, Jr. |
| 3,415,687 A | 12/1968 | Methlie, II |
| 3,822,148 A | 7/1974 | Dey et al. |
| 3,853,627 A | 12/1974 | Lehmann et al. |
| 4,085,259 A | 4/1978 | Lauck |
| 4,113,929 A | 9/1978 | Margalit |
| 4,158,723 A | 6/1979 | Gabano et al. |
| 4,184,016 A | 1/1980 | Lecerf |
| 4,229,509 A | 10/1980 | Margalit |
| 4,233,374 A | 11/1980 | Lecerf |
| 4,268,588 A | 5/1981 | Lecerf et al. |
| 4,271,243 A | 6/1981 | Broussely et al. |
| 4,309,491 A | 1/1982 | Brec et al. |

(Continued)

FOREIGN PATENT DOCUMENTS

EP 0 127 134 12/1984

(Continued)

OTHER PUBLICATIONS

Fiordiponti et al., "Behavior of Bi2O3 as a Cathode for Lithium Cells", Journal of the Electrochemical Socistey, pp. 14-17.*

(Continued)

*Primary Examiner*—Patrick Ryan
*Assistant Examiner*—Monique Wills
(74) *Attorney, Agent, or Firm*—Fish & Richardson P.C.

(57) ABSTRACT

A primary battery includes a cathode having an oxide containing one or more metals and pentavalent bismuth, an anode, a separator between the cathode and the anode, and an alkaline electrolyte. The metal(s) can be an alkali metal, an alkaline earth metal, a transition metal, and/or a main group metal. The separator can be ion-selective or capable of substantially preventing soluble bismuth ionic species from diffusing from the cathode to the anode.

53 Claims, 15 Drawing Sheets

U.S. PATENT DOCUMENTS

| | | | |
|---|---|---|---|
| 4,444,857 | A | 4/1984 | Duchange et al. |
| 4,804,597 | A | 2/1989 | Tahara et al. |
| 5,368,957 | A | 11/1994 | Kozmik et al. |
| 5,389,469 | A | 2/1995 | Passaniti et al. |
| 5,589,109 | A | 12/1996 | Passaniti et al. |
| 5,658,688 | A | 8/1997 | Jolson |
| 5,952,124 | A | 9/1999 | Kainthla et al. |
| 6,001,508 | A | 12/1999 | Passaniti et al. |
| 2003/0082450 | A1 | 5/2003 | Tanoue et al. |
| 2004/0121235 | A1 | 6/2004 | Amatucci |

FOREIGN PATENT DOCUMENTS

| | | |
|---|---|---|
| GB | 2202670 | 9/1988 |
| JP | 55/111067 | 8/1980 |
| JP | 56/159067 | 12/1981 |
| JP | 58/001971 | 1/1983 |
| JP | 58/048357 | 3/1983 |
| JP | 04/002020 | 7/1992 |
| JP | 52/12425 | 8/1993 |
| WO | WO 2005/034267 A2 | 4/2005 |
| WO | WO 2006/110354 A1 | 10/2006 |

OTHER PUBLICATIONS

Sharma et al., Synthesis and characterization of $AgBiO_3$ with the cubic $KSbO_3$ structure, Indian Journal of Chemistry, vol. 43A, pp. 11-17, Jan. 2004.

Bervas et al., "Carbon Bismuth Oxyfluoride Nanocomposites as Cathode Material for Lithium Battery", Abs. 419, 206th Meeting, Electrochemical Society, 2004.

Antipov et al., "The Superconducting Bismuth-based Mixed Oxides", Journal of Low Temperature Physics, vol. 131, Nos. 3/4, May 2003.

Jain et al., "Nanosized Amphorous Iron Oxyhydroxide for Reversible Lithium Intercalation", Journal of the Electrochemical Society, 150, (6), pp. A806-A810, 2003.

Oberndorfer et al., "A New Approach to Silverbusmuthates", Z. Anorg. Allg. Chem., 628, pp. 1951-1954, 2002 (English Abstract Only).

Rodriguez et al., "Electrochemical study of the reaction of lithium with Aurivillius and related phases", Material Research Bulletin, 36, pp. 1195-1204, 2001.

Kumada et al., "Preparation of New Bismuth Oxides by Hydrothermal Reaction", Mat. Res. Soc. Symp. Proc., vol. 658, pp. GG8.721-GG8.76, 2001.

Liu et al., "Synethesis of superconducting $Ba_{1-x}K_xBiO_3$ by a modified molten salt process", Materials Research Bulletin, 36, pp. 1505-1512, 2001.

Patoux et al., "Lithium- and Proton Driven Redox Reactions in BIMEVOX-Type Phases", Chem. Meter., 13, 500-7, 2001.

Arroyo et al., "From $Bi_4V_2O_{11}$ to $Li_{.28}B_4V2O_{11}$ by electrochemical lithium insertion: versatile applications in lithium batteries", International Journal of Inorganic Materials, 1, pp. 83-86, 1999.

Apostolova et al., "Study of Bismuth-containing Oxide Compounds as Cathode Materials for Lithium Batteries", Russian Journal of Applied Chemistry, vol. 72, No. 8, pp. 1377-1380, 1999.

Kumada et al., Ion-exchange reaction of $Na^+$ in $NabiO_3 \cdot nH_2O$ with $Sr^{2+}$ and $Ba^{2+}$, Solid State Ionics, 122, pp. 183-189, 1999.

Deibele et al., "Bismusth in $Ag_2BiO_3$:Tetravalent of Internally Disproportionated", Journal of Solid State Chemistry, 147, pp. 117-121, 1999.

Kumada et al., "Preparation of $ABi_2O_6$ (A=Mg, Zn) with the Trirutile-type Structure", Materials Research Bulletin, vol. 32, No. 8, pp. 1003-2008, 1997.

Lazure et al., "Composition dependence of oxide anion conduction in the BIMEVOX family", Solid State Ionics, 90, pp. 117-123, 1996 (Abstract only).

Arroyo et al., "$Bi_4V_2O_{11}$ and related compounds as positive electrode materials for lithium rechargeable batteries", Solid State Ionics, 91, pp. 273-278, 1996.

Kumada et al., "Preparation and Crystal Structure of a New Lithium Bismuth Oxide: $LiBiO_3$", Journal of Solid State Chemsitry, 126, pp. 121-126, 1996.

Pasquali et al., "Primary 1.5 Lithium Cells with $ViVO_4$ Cathodes", Journal of Power Sources, 27, pp. 29-34, 1989.

Takeuchi et al., "The Reduction of Silver Vanadium Oxide in Lithium/Silver Vanadium Oxide Cells", J. Electrochem. Soc.: Electrochechemical Science and Technology, vol. 135, No. 11, pp. 2691-2694, 1988.

Pistoia et al., "Button Cells Based on the $Li/Bi_2O_3$ Couple", Journal of Power Sources, 16, pp. 263-269, 1985.

Linden in "Handbook of Batteries and Fuel Cells", Handbook of Batteries and Fuel Cells, pp. 11-79-11-81, 1984.

Trehoux et al., Synthese et Caracterisation de Nouvelles Phases due Diagramme (K Ou Na)—Bi—O, Mat. Res. Bull, vol. 17, pp. 1235-1243, 1982 (French Only).

Cox, "Mixed-Valent $Ba^2Bi^{3+}Bi^{5+}O6$:Structure and Properties vs. Temperature", Acta Cryst., B35, pp. 1-10, 1979.

Murphy et al., "Topochemical Reactions of Rutile Related Structures with Lithum", Mat. Res. Bull. vol. 13, pp. 1395, 1402, 1978.

Blasse, "On the Structure of some Compounds $Li_3Me^5+O_4$ and some other Mixed Metal Oxides Containing Lithium", Zeitschrift fur anorganische und allegemeine Chemie Band 331, pp. 44-51, 1964.

Scholder et al., "Alkali and alkaline and earth bismuthates", Zeitschrift fur anorganische und allegemeine Chemie Band 319, pp. 375-386, 1963 (English Abstract Only).

Latimer "The Oxidation States of the Elements and Their Potentials in Aqueous Solutions", 2nd ed., Prentice-Hall, New York, pp. 122-123, 1952.

Scholder et al., "On Bismuthates", Zeitschrift fur anorganishe und allegemeine Chemie 247, pp. 392-415, 1941 (English Translation).

Nguyen et al., "Electrosynthesis of $KBiO_3$: A Potassium Ion Conductor with the $KSbO_3$ Tunnel Structure", Chem. Mater., vol. 5, pp. 1273-1276, 1993.

Hubenthal et al., "The First Quaternary Oxobismuthate(V): $KLi_6BiO_6$", Acta Chemica Scandinavica, vol. 45, pp. 805-811, 1991.

Nomura et al., "Brief Communication Ionic Conductivity of $Li_7BiO_6$", Journal of Solid State Chemical Chemistry, vol. 52, pp. 91-93, 1984.

Kumada et al., "Neutron Powder Diffraction Refinement Of Ilmenite-Type Bismuth Oxides: $AbiO_3$ (A=Na,Ag)", Materials Research Bulletin, pp. 2397-2402, vol. 35, No. 14/15, Nov. 2000.

Kumada et al., "Synthesis Of New Ilmenite-Type Oxides, AgMO (M=Sb,Bi) By Ion-Exchange Reaction", Advances in Ion Exchange for Industry and Research, pp. 212-217, 1999.

Kumada et al., "Preparation of $Ab_2O_6$ (A+Mg, An) With The Trirutile-Type Structure", Materials Research Bulletin, pp. 1003-1008, vol. 32, No. 8, Aug. 1997.

Mergen et al., "Crystal Chemistry, Thermal Expansion And Dielectric Properties Of $(Bi_{1.5}ZN_{0.5})O_7$ Pyrochlore", Materials Research Bulletin, pp. 175-189, vol. 32, No. 2, Jan. 1997.

Kumada et al., "Crystal Structure of $Bi_2O_4$ with $\beta$-$Sb_2O_4$-Type Structure", Journal of Solid State Technology, pp. 281-285, vol. 116, No. 2, May 1995.

Kinomura et al., "Preparation of Bismuth Oxides with Mixed Valence from Hydrated Sodium Bismuth Oxide", Materials Reseach Bulletin, pp. 129-134, vol. 30, No. 2, Feb. 1995.

Passaniti et al., "Silver Oxide Cells", Handbook of Batteries, pp. 12.1-12.16, 1995.

Lovrecek et al., "Monographs in Electroanalytical Chemistry and Electrochemistry",Standards Potential in Aqueous Solution, pp. 180-187, 1985.

Broussely et al., "Lithium-Bismuth Metal Oxide Cells", Lithium Batteries, pp. 97-114, 1983.

Fiordiponti et al., "Behavior of $Bi_2O_3$ as a Cathode for Lithium Cells", Journal of the Electrochemical Society, pp. 14-17.

Muylder et al., "Bismuth", Cebelcor, pp. 534-539, 1957.

Kinoshita, "Properties of Bismuth Oxide as an Active Material of Negative Electrode in Alkaline Storage Cell", Bull. Chem. Soc., Japan, pp. 59-65, 1940.

* cited by examiner

FIG. 2

Theoretical Volumetric Capacities and Energy Densities (total cell) for 1.5V alkaline zinc cells containing metal bismuth oxides.

| Cathode Material | Electrons per formula unit | Theoretical Specific Capacity (mAh/g) | Average CCV (V) | Density (g/cm$^3$) | Theoretical Volumetric Capacity (Ah/cm$^3$) | Theoretical Energy Density (total cell)[a] (Wh/L) |
|---|---|---|---|---|---|---|
| KBiO$_3$ | 2 | 181 | 1.65 | 5.87 | 1.06 | 1483 |
| AgBiO$_3$ | 3 | 220 | 1.4 | 8.18 | 1.80 | 1930 |
| ZnBi$_2$O$_6$ | 4 | 185 | 1.65 | 8.44 | 1.56 | 2035 |
| MgBi$_2$O$_6$ | 4 | 199 | 1.68 | 7.92 | 1.58 | 2088 |
| CdBi$_2$O$_6$ | 4 | 171 | (1.5)[b] | (8.2)[b] | 1.40 | 1698 |
| Cu$_2$Bi$_2$O$_7$ | 6 | 245 | (1.4)[b] | (8.2)[b] | 2.01 | 2093 |

[a] assuming discharge capacity of cathode and anode balanced
[b] estimated value

FIG. 3

| Example | M = | Calculated (weight percent) | | | | Observed (weight percent) | | | | |
|---|---|---|---|---|---|---|---|---|---|---|
| | | Na | Co | M | Bi | Na (ppm) | Co | M | Bi |
| 1a | Zn | 0 | 0 | 11.29 | 72.14 | 81 | --- | 10.85 | 65.88 |
| 1b | Zn | 0 | 1.92 | 10.95 | 69.98 | 75 | 1.46 | 8.09 | 66.22 |
| 2a | Mg | 0 | 0 | 4.52 | 77.65 | --- | --- | --- | --- |
| 2b | Mg | 0 | 1.92 | 4.38 | 75.32 | <34 | 1.95 | 4.05 | 68.00 |
| 3 | Cu | 0 | 0 | 19.34 | 63.61 | <44 | --- | 14.45 | 60.29 |
| 4 | Ag | 0 | 0 | 29.57 | 57.28 | 7200 | --- | 27.66 | 52.73 |

"---" = not analyzed

FIG. 7

| Example | Cathode Material | Low-rate Capacity To 0.8 V (mAh/g) | Percent Utilization | Low-rate Capacity To 0.6 V (mAh/g) | Percent Utilization | High-rate Capacity To 0.8 V (mAh/g) | Percent Utilization | High-rate Capacity To 0.6 V (mAh/g) | Percent Utilization |
|---|---|---|---|---|---|---|---|---|---|
| 1a | $ZnBi_2O_6$ | 30 | 16 | ND | ND | ND | ND | ND | ND |
| 1b | CoOOH-coated $ZnBi_2O_6$ | 102 | 55 | 335 | 72 | 58 | 31 | ND | ND |
| 2a | $MgBi_2O_6$ | 77 | 40 | 309 | 62 | 85 | 43 | 300 | 60 |
| 2b | CoOOH-coated $MgBi_2O_6$ | 116 | 58 | 345 | 68 | 89 | 45 | 310 | 60 |
| 3 | $Cu_2Bi_2O_7$ | 50 | 20 | 360 | 63 | 35 | 14 | 170 | 30 |
| 4 | $AgBiO_3$ | 170 | 77 | 310 | 70 | 165 | 75 | 360 | 81 |
| 5a | $KBiO_3$ | 100 | 55 | 357 | 79 | 70 | 39 | 315 | 69 |
| 5b | CoOOH-coated $KBiO_3$ | 105 | 58 | 375 | 83 | 80 | 45 | 205 | 45 |
| C1 | $NaBiO_3$ | 20 | 10 | 325 | 74 | ND | ND | ND | ND |
| C2 | $Bi_2O_4$ | 20 | 18 | 336 | 75 | 0 | 0 | 360 | 81 |
| C3 | $Bi_2O_3$ | 0 | 0 | 260 | 75 | 0 | 0 | 155 | 45 |

ND = not determined

US 7,407,726 B2

PRIMARY ALKALINE BATTERY CONTAINING BISMUTH METAL OXIDE

CLAIM OF PRIORITY

This application claims priority under 35 U.S.C. § 119(e) to U.S. Provisional Patent Application Ser. No. 60/503,667, filed on Sep. 16, 2003, the entire contents of which are hereby incorporated by reference.

FIELD OF THE INVENTION

The invention relates to primary alkaline batteries.

BACKGROUND

Batteries, such as alkaline batteries, are commonly used as electrical energy sources. Generally, a battery contains a negative electrode (anode) and a positive electrode (cathode). The negative electrode contains an electroactive material (such as zinc particles) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY

The invention relates to primary alkaline batteries including bismuth.

In one aspect, the invention features a primary battery including a cathode having an active material including an oxide containing one or more metals and pentavalent bismuth (i.e., $Bi^{5+}$), an anode, an ion-permeable separator between the cathode and the anode, and an alkaline electrolyte.

Primary batteries are meant to be discharged, e.g., to exhaustion, only once, and then discarded. Primary batteries are not intended to be recharged. In comparison, secondary batteries can be recharged many times, e.g., more than fifty times, more than a hundred times, or more.

The pentavalent bismuth-containing metal oxide is capable of enhancing overall battery performance. For example, alkaline cells with cathodes including the pentavalent bismuth-containing metal oxide are capable of providing substantial total discharge capacity at commercially useful average running voltages of between 1.4 and 1.7 V (e.g., at low discharge rates) and can have relatively flat discharge voltage profiles suitable for powering certain digital electronic devices. The pentavalent bismuth-containing metal oxide also can provide good cathode utilization (e.g., at high discharge rates). The cathode active material can be incorporated into cylindrical alkaline batteries of different sizes (e.g., AA, AAA, AAAA, C, D) as well as into batteries having other form-factors such as button cells, coin cells, prismatic or flat batteries, and flexible pouch, envelope or bag cells in a cost effective manner. Many bismuth-containing compounds have low toxicity and benign environmental impact, so the manufacture and disposal of batteries containing pentavalent bismuth-containing metal oxides can raise relatively few health and environmental concerns.

In another aspect, the invention features a primary battery including a cathode having an oxide containing an alkali metal and pentavalent bismuth, the alkali metal being lithium or potassium, an anode, a separator between the cathode and the anode, and an alkaline electrolyte. The oxide can be, for example, $LiBiO_3$, $Li_3BiO_4$, $Li_5BiO_5$, $Li_7BiO_6$, $Li_6KBiO_6$, $Li_4Bi_2O_7$, $Li_5Bi_3O_{10}$ or $KBiO_3$.

In another aspect, the invention features a primary battery including a cathode having an oxide containing an alkaline earth metal and pentavalent bismuth, an anode, a separator between the cathode and the anode, and an alkaline electrolyte. The alkaline earth metal can be magnesium, calcium, strontium, or barium. The oxide can be, for example, $MgBi_2O_6$, $Sr_2Bi_2O_7$ or $Ba_2Bi_2O_6$.

In another aspect, the invention features a primary battery including a cathode having an oxide containing a metal and pentavalent bismuth, the metal being a main group metal, a lanthanide or a transition metal other than silver, an anode, a separator between the cathode and the anode, and an alkaline electrolyte.

The transition metal can be, for example, scandium, vanadium, manganese, iron, cobalt, nickel, copper, zinc, yttrium, zirconium, niobium, molybdenum, ruthenium, palladium, cadmium, tantalum, or tungsten. The lanthanide can be, for example, lanthanum, cerium, neodymium, samarium, europium, gadolinium, terbium, dysprosium, holmium, erbium, thulium, or ytterbium. The main group metal can be, for example, indium, tin, antimony or lead. Examples of oxides include $ZnBi_2O_6$, $Cu_2Bi_2O_7$, $CdBi_2O_6$, and $Sr_2ScBiO_6$.

Embodiments of the above aspects may include one or more of the following features. The oxide can include an electrically conductive portion, such as an electrically conductive surface coating including carbon or a conductive metal oxide. The anode includes zinc. The electrolyte includes lithium hydroxide, sodium hydroxide, and/or potassium hydroxide. The separator is capable of preventing soluble bismuth species from diffusing from the cathode to the anode. The separator also can be capable of trapping soluble bismuth species.

Other aspects, features, and advantages of the invention will be apparent from the drawing, description, and claims.

DESCRIPTION OF THE DRAWINGS

FIG. 2 is a table showing theoretical gravimetric capacities, volumetric capacities and volumetric energy densities of selected primary alkaline zinc cells containing pentavalent bismuth-containing metal oxides having a nominal 1.5 V average running voltage.

FIG. 3 is a table showing chemical compositions of selected pentavalent bismuth-containing metal oxides as determined by inductively coupled plasma spectroscopic analysis.

FIG. 7 is a table showing gravimetric specific capacities of alkaline button cells with cathodes containing uncoated and CoOOH-coated bismuth-containing metal oxides discharged to 0.6V and 0.8V cutoff voltages.

DETAILED DESCRIPTION OF THE PREFERRED EMBODIMENTS

Figure 1:
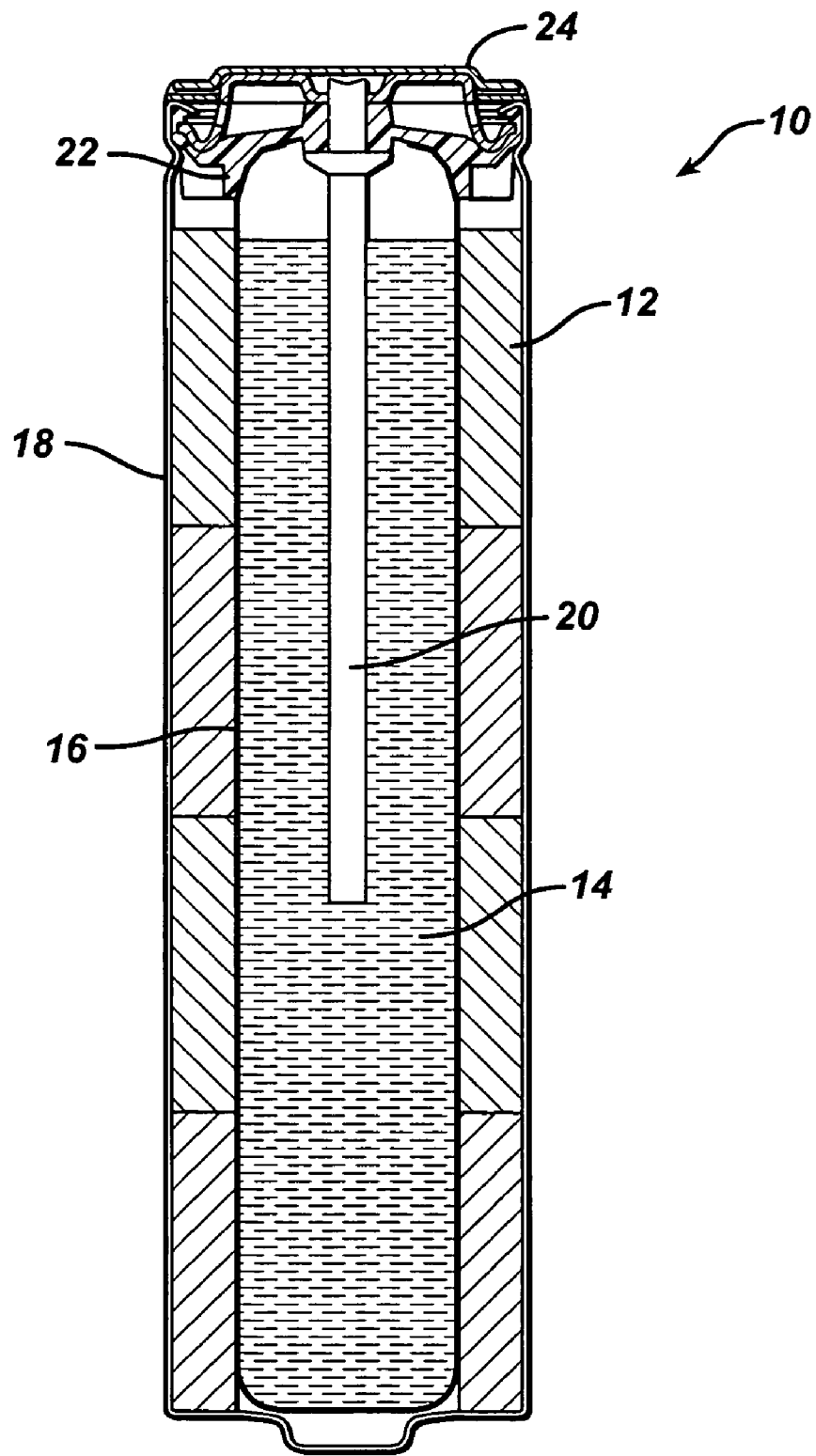
FIG. 1 is a side-sectional view of a battery.

Referring to FIG. 1, a battery 10 includes a cylindrical housing 18, a cathode 12 in the housing, an anode 14 in the housing, and a separator 16 between the cathode and the anode. Battery 10 also includes a current collector 20, a seal 22, and a metal top cap 24, which serves as the negative terminal for the battery. Cathode 12 is in contact with housing 18, and the positive terminal of battery 10 is at the opposite end of battery 10 from the negative terminal. An electrolyte solution, e.g., an alkaline solution, is dispersed throughout battery 10.

Cathode 12 includes an electrochemically active material having a pentavalent bismuth-containing metal oxide, an electrically conductive additive, and optionally, a binder.

In particular, the pentavalent bismuth-containing metal oxide, sometimes called a "bismuthate", is generally a complex oxide containing pentavalent bismuth, i.e., $Bi^{5+}$, optionally, trivalent bismuth, i.e., $Bi^{3+}$ as a minor constituent (e.g., less than about 50 atomic percent) and one or more metals. For example, of the bismuth in a chemical formula unit of the complex metal oxide, at least about 50 atomic percent (e.g., at least about 60, 70, 80, or 90 atomic percent) is formally pentavalent bismuth. Pentavalent bismuth-containing metal oxides are capable of providing battery 10 with high volumetric energy density (e.g., theoretical volumetric energy density can be higher than commercial alkaline zinc primary cells including $MnO_2/Zn$, $\beta$-NiOOH/Zn or $Ag_2O/Zn$) and having a commercially useful average running voltage range (e.g., a closed circuit voltage, CCV, of from about 1.4 to 1.7 V (FIG. 2)). The pentavalent bismuth-containing metal oxides have low solubility, typically less than about 70 ppm, preferably less than about 40 ppm, more preferably less than about 10 ppm at room temperature in an alkaline electrolyte. As a result, battery 10 can have good ambient shelf life. The pentavalent bismuth-containing metal oxides also are thermally stable in air to a temperature greater than about 200° C. (e.g., greater than about 300° C.). It is believed that the good thermal stability of the pentavalent bismuth-containing metal oxides is indicative of the structural stability of the crystallographic lattice structure of the oxides and the chemical stability of the oxides in the presence of electrolyte and other materials included in the battery. The pentavalent bismuth-containing metal oxides can have rutile, trirutile, fluorite, pyrochlore, perovskite-type or other related crystallographic lattice structures. As discussed below, the metal of the pentavalent bismuth-containing metal oxide can be an alkali metal, an alkaline earth metal, a transition metal, a lanthanide, and/or a main group metal.

In embodiments in which the pentavalent bismuth-containing metal oxide includes an alkali metal, the metal can be lithium, sodium, potassium, rubidium and/or cesium. Examples of pentavalent bismuth metal oxides including an alkali metal include $MBiO_3$, $M_3BiO_4$, $M_7BiO_6$, $M_4Bi_2O_7$, $M_5Bi_3O_{10}$, where M can be Li, Na, K, Rb, and/or Cs; $Li_5BiO_5$; and $Li_6KBiO_6$. Syntheses of such alkali metal pentavalent bismuth-containing oxides are described, for example, in J. Trehoux et al., *Mater. Res. Bull.*, 17, 1235-43 (1982); E. Nomura et al., *J. Solid State Chem.*, 52, 91-3 (1984); C. Greaves et al., *Mater. Res. Bull.*, 24, 973-980 (1989); S. Kodialam et al., *Mater. Res. Bull.*, 27, 1379-1384 (1992); T. N. Nguyen et al., Chem. Mater., 5(9), 1273-6 (1993); B. K. Kasenov et al., *Zhur. Fiz. Khim.*, 71(6), 1146-8 (1997); N. Kumada et al., *J. Solid State Chem.*, 126, 121-6 (1996); *Mater. Res. Bull.*, 32(8), 1003-1009 (1997). Any of the pentavalent bismuth-containing metal oxides can include more than one type of alkali metal, in any combination, for example, by ion substitution or ion exchange. Some examples include $Li_{1-x}Na_xBiO_3$ and $Na_{1-x}K_xBiO_3$, where $0<x<1$; $KLi_6BiO_6$; and $RbLi_6BiO_6$. The pentavalent bismuth-containing alkali metal oxides can be stoichiometric or non-stoichiometric, and can include trivalent bismuth as a minor constituent, e.g., less than about 50 atomic percent, 30 atomic percent, or 10 atomic percent. Syntheses of mixed alkali metal pentavalent bismuth-containing oxides are described, for example, in R. Huebenthal & R. Hoppe, *Acta Chem. Scand.*, 45(8), 805-811 (1991); and V. A. Carlson & A. M. Stacy, *J. Solid State Chem.*, 96, 332-343 (1992).

In embodiments in which the pentavalent bismuth-containing metal oxide includes an alkaline earth metal, the metal can be magnesium, calcium, strontium, and/or barium. Examples of alkaline metal bismuth oxides include $MgBi_2O_6$, $Ba_2Bi_2O_6$ or $Sr_2Bi_2O_7$. Syntheses of alkaline earth metal pentavalent bismuth-containing oxides are described, for example, in K. Kumada et al., *Mater. Res. Bull.*, 32, 1003-8 (1997); D. E. Cox & A. W. Sleight, *Solid State Commun.*, 19, 969-973 (1976); or O. Knop et al., *Can. J. Chem.*, 58, 2221(1980). In some cases, for example, alkaline earth bismuth oxides such as the perovskite-related $Ba_2Bi_2O_6$, the bismuth can have mixed valence, i.e., having both $Bi^{5+}$ and $Bi^{3+}$ species present. As with the alkali metal pentavalent bismuth-containing oxides, any of the alkaline earth metal pentavalent bismuth-containing oxides can include more than one type of alkaline earth metal or a combination of one or more alkali metals and one or more alkaline earth metals, in any combination. Some examples include $Ba_{1-x}K_xBiO_3$ and $Sr_{1-x}K_xBiO_3$ (which also contain mixed valence bismuth, e.g., $Ba_{0.6}K_{0.4}BiO_3$), $LiSr_3BiO_6$, and $Li_2Ba_5Bi_2O_{11}$. The alkaline earth bismuth oxides can be stoichiometric or non-stoichiometric, and can include trivalent bismuth as a minor constituent. Syntheses of mixed alkali metal and alkaline earth metal pentavalent bismuth-containing oxides are described, for example, in A. W. Sleight et al., *Solid State Commun.*, 17, 27-8 (1975); *J. Solid State Chem.*, 78, 319 (1989); M. L. Norton, *Mater. Res. Bull.*, 24, 1391-7 (1989); S. F. Liu & W. T. Fu, *Mater. Res. Bull.*, 36, 1505-12(2001); and V. A. Carlson & A. M. Stacy, J. Solid State Chem., 96, 332-343 (1992).

The pentavalent bismuth-containing metal oxide can include one or more transition metals and/or one or more main group metals. The transition metal can be a first row transition metal (e.g., Sc, V, Mn, Fe, Co, Ni, Cu, or Zn), a second row transition metal (e.g., Y, Zr, Nb, Mo, Ru, Pd, Ag or Cd) or a third row transition metal (e.g., Ta, W). Examples of pentavalent bismuth-containing transition metal oxides include $ZnBi_2O_6$, $Cu_2Bi_2O_7$, $CdBi_2O_6$, $AgBiO_3$, $Ag_{25}Bi_3O_{18}$, $Ba_2YBiO_6$, $Sr_2ScBiO_6$, $Sr_{18}Ru_{1.9}Bi_{4.1}O_{33}$, and $Li_8PdBi_2O_{10}$. Synthesis of transition metal pentavalent bismuth-containing oxides are described, for example, in N. Kumada et al., *Mater. Res. Bull.*, 32, 1003-8 (1997); *Adv. Ion-Exchange for Industry Research*, 239, 212-217 (1999); *Mater. Res. Bull.*, 35(2), 2397-2402 (2000); H. Mizoguchi et al., *Chem. Commun.*, (9), 1084-5 (2003); M. Bortz & M. Jansen, *Z. Anorg. Allgem. Chem*, 612, 113-7 (1992); M. S. Martin-Gonzalez et al., *J. Solid State Chem.*, 173, 203-8 (1993); and Y. Laligant & A. LeBail, *Euro. J. Solid State Inorg. Chem.*, 30, 689-698 (1993). The transition metal can be a lanthanide (e.g., La, Ce, Pr, Nd, Sm, Eu, Gd, Tb, Dy, Ho, Er, Tm or Yb). Examples of pentavalent bismuth-containing lanthanide oxides include $Ba_2LaBiO_6$ and $Sr_2NdBiO_6$. Syntheses of pentavalent bismuth-containing lanthanide oxides are described, for example, in H. Mizoguchi et al., *Chem. Commun.*, (9), 1084-5 (2003) and A. Lenz & H. Mueller-Buschbaum, *J. Less Common Metals*, 161(1), 141-6 (1990). The main group metal can be, for example, In, Sn, Pb or Sb. Examples of pentavalent bismuth-containing main group oxides include $Ba_2InBiO_6$ and $BaBi_{1-x}Pb_xO_3$. Syntheses of pentavalent bismuth-containing main group metal oxides are described, for example, in W. T. Fu et al., Mater. Res. Bull., 35, 1205 (2000) and A. W. Sleight et al., *Solid State Commun.*, 17, 27 (1975). As with the pentavalent bismuth-containing metal oxides described above, the pentavalent bismuth-containing transition metal oxides, lanthanide oxides, or main group metal oxides can include more than one type of metal, in any combination. The pentavalent bismuth-containing metal oxides can be stoichiometric or non-stoichiometric, and also can contain mixed valence bismuth, i.e., both $Bi^{5+}$ and $Bi^{3+}$ species can be present.

In some embodiments, the pentavalent bismuth-containing metal oxide cathode materials are capable of being reduced, e.g., to bismuth metal, during discharge without consuming water from the electrolyte solution. For example, referring to Equations 1-8 below, $ZnBi_2O_6$, is capable of undergoing reduction in two steps. The first step (Equation 1) is a two-electron per bismuth reduction to $Bi_2O_3$, and the second step (Equation 5), a three-electron per bismuth reduction to Bi metal.

Cathode Reaction: $ZnBi_2O_6 + 2H_2O + 4e^- \rightarrow ZnO + Bi_2O_3 + 4OH^-$ (1)

Anode Reactions: $2Zn + 8OH^- \rightarrow 2Zn(OH)_4^{2-} + 4e^-$ (2)

$2Zn(OH)_4^{2-} \rightarrow 2ZnO + 4OH^- + 2H_2O$ (3)

Net Reaction: $ZnBi_2O_6 + 2Zn \rightarrow 3ZnO + Bi_2O_3$ (4)

Cathode Reaction: $Bi_2O_3 + 3H_2O + 6e^- \rightarrow 2Bi^0 + 6OH^-$ (5)

Anode Reactions: $3Zn + 12OH^- \rightarrow 3Zn(OH)_4^{2-} + 6e^-$ (6)

$3Zn(OH)_4^{2-} \rightarrow 3ZnO + 6OH^- + 3H_2O$ (7)

Net Reaction: $Bi_2O_3 + 3Zn \rightarrow 3ZnO + 2Bi^0$ (8)

The net cell discharge reactions are shown in Equations 4 and 8. Since water is not consumed in either net cell discharge reaction, the total amount of water included in battery 10 (e.g., in the electrolyte) can be decreased without comprising performance. As a result, additional electrode active material can be added to cathode 12 and/or anode 14 in battery 10, thereby increasing total discharge capacity. In some embodiments, cathode 12 includes between about 50 percent and about 95 percent by weight, preferably between about 60 percent and about 90 percent by weight, and more preferably between about 70 percent and about 85 percent by weight, of the cathode active material by weight. Cathode 12 can include greater or equal to about 50, 60, 70, 80, or 90 percent by weight, and/or less than or equal to about 95, 90, 80, 70, or 60 percent by weight of the cathode active material. Cathode 12 can include one or more (e.g., two, three or more) of the above pentavalent bismuth-containing metal oxides, in any combination. For example, cathode 12 can include a mixture of $KBiO_3$, $MgBi_2O_6$, and/or $ZnBi_2O_6$.

One or more pentavalent bismuth-containing metal oxides can make up all of the active material of cathode 12, or a portion of the active material of cathode 12. For example, as the active material of cathode 12, the pentavalent bismuth-containing metal oxide(s) can be mixed with manganese dioxide (e.g., electrolytically-synthesized γ-$MnO_2$ (EMD), or chemically-synthesized γ-$MnO_2$ (CMD) or a blend of EMD and CMD). The manganese dioxide can be EMD having a high power coefficient, as described in U.S. application Ser. No. 09/563,447, filed May 1, 2000, hereby incorporated by reference in its entirety. The pentavalent bismuth-containing metal oxides can enhance the average running voltage and/or the volumetric energy density of the manganese oxide-containing battery. In addition, because the pentavalent bismuth-containing metal oxides can have substantially higher true densities than EMD and do not consume water during discharge unlike EMD, the volumetric capacities of alkaline cells containing pentavalent bismuth-containing metal oxides can be substantially greater than that of alkaline cells containing EMD. In some cases, for example, the specific discharge capacity above about 0.8 V of alkaline cells containing the pentavalent bismuth-containing metal oxides as additives can be increased substantially compared to cells containing EMD as the sole active cathode material. Moreover, cathode utilization (e.g., below about 0.8V) for alkaline cells containing the pentavalent bismuth-containing metal oxides as additives can be increased because of the formation of metallic Bi from reduction of $Bi_2O_3$ during cell discharge. In a cathode including a mixture of active materials, the pentavalent bismuth-containing metal oxides can make up between greater than about one percent to less than about 100 percent by weight of the active materials. For example, cathode 12 can include greater than or equal to about 0%, 10%, 20%, 30%, 40%, 50%, 60%, 70%, 80%, or 90% by weight of pentavalent bismuth-containing metal oxide(s); and/or less than or equal to about 100%, 90%, 80%, 70%, 60%, 50%, 40%, 30%, 20%, or 10% by weight of pentavalent bismuth-containing metal oxide(s). Other examples of suitable cathode active materials that can be used in combination with pentavalent bismuth-containing metal oxide(s) include β-NiOOH, γ-NiOOH, AgO, $Ag_2O$, $AgNiO_2$, or $AgCoO_2$.

The pentavalent bismuth-containing metal oxide can be a semiconductor, such as $MgBi_2O_6$, $ZnBi_2O_6$, and $Ba_2InBiO_6$, for example. Further, the pentavalent bismuth-containing metal oxide can be a degenerate n-type semiconductor, such as $MgBi_2O_6$ and $ZnBi_2O_6$ as described in H. Mizoguchi et al., *Chem. Commun.*, (9), 1084-5 (2003).

In some embodiments, to enhance its bulk electrical conductivity, the pentavalent bismuth-containing metal oxide particles can include an electrically conductive surface coating. The conductive surface coating also can serve to enhance the total discharge capacity and/or the average running voltage of battery 10 (e.g., at low discharge rates), as well as enhance the effective cathode utilization (e.g., at high discharge rates). The conductive surface coating can include a carbonaceous material, such as graphite (natural or synthetic), carbon black, and/or acetylene black. The conductive surface coating can include a metal, such as gold or silver, and/or a conductive or semiconductive metal oxide, such as cobalt oxide (e.g., $Co_3O_4$), cobalt oxyhydroxide, silver oxide, silver nickel oxide, nickel oxyhydroxide, indium oxide or indium tin oxide. The conductive surface coating can be applied or deposited, for example, using solution techniques including electrodeposition, electroless deposition or by vapor phase deposition (e.g., sputtering, physical vapor deposition, or chemical vapor deposition). A suitable conductive coating thickness can be provided by applying the conductive material at a level of about 3-10 percent by weight (e.g., greater than or equal about 3, 4, 5, 6, 7, 8, or 9 percent by weight, and/or less than or equal to about 10, 9, 8, 7, 6, 5, or 4 percent by weight) relative to the total weight of the pentavalent bismuth-containing metal oxide.

In addition, as indicated above, cathode 12 can include an electrically conductive additive capable of enhancing the bulk electrical conductivity of cathode 12. Examples of conductive additives include natural or non-synthetic graphite, synthetic graphite, bismuth powder, gold powder, and/or carbon nanofibers. Preferred conductive additives include graphite particles and carbon nanofibers. In certain embodiments, the graphite particles are nonsynthetic, nonexpanded graphite particles, available from, for example, Brazilian Nacional de Grafite, Itapecirica, MG Brazil (e.g., MP-0702X). In other embodiments, the graphite particles are synthetic, non-expanded graphite particles, available from, for example, Timcal, Ltd., Bodio, Switzerland (e.g., Timrex® KS15, SFG15). Carbon nanofibers are described, for example, in commonly-assigned U.S. Ser. No. 09/658,042, filed Sep. 7, 2000, and U.S. Ser. No. 09/829,709, filed Apr. 10, 2001. Cathode 12 can include from about 5 to about 35 percent (e.g., from about 8 to about 20 percent by weight) of conductive additive.

An optional binder can be added to enhance the structural integrity of cathode 12. Examples of binders include polyethylene powders, polyacrylamides, Portland cement, and various fluorocarbon resins, such as polyvinylidenefluoride (PVDF) and polytetrafluoroethylene (PTFE). An example of a suitable polyethylene binder is sold under the tradename Coathylene HA-1681 (available from Hoescht). The cathode 12 can include, for example, from about 0.1 percent to about 2 percent by weight of binder. Cathode 12 also can include other optional additives. For example, addition of small amounts (e.g., about 0.01 to about 1 weight percent) of a fluoride salt, e.g., potassium fluoride, to the cathode of a nickel-zinc cell was disclosed in U.S. Patent Application Publication No. 2002-0192547 to improve nickel cathode utilization.

The electrolyte solution also is dispersed throughout cathode 12, e.g., at about 5-7 percent by weight. Weight percentages provided above and below are determined after the electrolyte solution was dispersed in cathode 12. The electrolyte solution can be any of the electrolyte solutions commonly used in alkaline batteries. The electrolyte solution can be an alkaline solution, such as an aqueous alkali metal hydroxide solution, e.g., LiOH, NaOH, KOH, or mixtures of alkali metal hydroxide solutions (e.g., KOH and NaOH, KOH and LiOH). For example, the aqueous alkali metal hydroxide solution can include between about 33 and about 45 percent by weight of the alkali metal hydroxide, such as about 9 N KOH (i.e., about 37% by weight KOH). In some embodiments, the electrolyte solution also can include up to about 6 percent by weight zinc oxide, e.g., about 2 percent by weight zinc oxide. In other embodiments, the electrolyte solution can include slightly soluble fluoride salts such as barium fluoride, calcium fluoride, magnesium fluoride, potassium fluoride, and strontium fluoride. Addition of barium fluoride to an alkaline electrolyte solution (e.g., 6M KOH+0.6M LiOH) at a concentration of from about 0.0001 to 0.001M was disclosed in U.S. Pat. No. 5,681,672 to improve cycle life and cycling efficiency of rechargeable alkaline nickel-zinc cells. Also, addition of potassium fluoride alone (e.g., 18-30 weight percent) or a combination of potassium fluoride (e.g., about 0.5 to 4M) and potassium carbonate (e.g., about 0.5 to 4M) to an alkaline electrolyte solution (e.g., 3M KOH+0.5M LiOH) was disclosed in U.S. Pat. Nos. 4,247,610 and 5,302,475 to improve capacity retention and high rate performance of rechargeable alkaline nickel-zinc cells.

Anode 14 can be formed of any of the standard zinc materials used in alkaline battery anodes. For example, anode 14 can be a zinc gel that includes zinc metal particles, a gelling agent, and minor amounts of additives, such as a gassing inhibitor. In addition, a portion of the electrolyte solution is dispersed throughout the anode.

The zinc particles can be any of the zinc particles conventionally used in gelled zinc anodes. Examples of zinc particles include those described in U.S. Pat. Nos. 6,284,410; 6,472,103; 6,521,378; and commonly-assigned U.S. Ser. No. 10/29,575 and U.S. Ser. No. 10/113,075, all hereby incorporated by reference. The anode may include, for example, between 67% and 71% of zinc particles by weight.

Examples of gelling agents include polyacrylic acids, grafted starch materials, salts of polyacrylic acids, polyacrylates, carboxymethylcellulose or combinations thereof. Examples of such polyacrylic acids are Carbopol 940 and 934 (available from B.F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from 0.1 percent to about 1 percent gelling agent by weight.

Gassing inhibitors can be inorganic materials, such as bismuth, tin, lead and indium and alloys or compounds thereof. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for primary alkaline battery separators. In some embodiments, separator 16 can be formed of two layers of a non-woven, non-membrane material with one layer being disposed along a surface of the other. To minimize the volume of separator 16 while providing an efficient battery, each layer of non-woven, non-membrane material can have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Typically, the layers can be substantially devoid of fillers, such as inorganic particles. In some embodiments, the separator can include inorganic particles. A separator including mostly insoluble alkaline earth metal fluoride particles (e.g., calcium fluoride, magnesium fluoride, barium fluoride, strontium fluoride) that can dissolve slowly in alkaline electrolyte solution is disclosed in U.S. Patent Application Publication No. 2002-0182512. Such a separator was disclosed to retard silver deposition and the resulting performance degradation in metal-silver batteries.

In other embodiments, separator 16 can include an outer layer of cellophane and a layer of non-woven material. The separator also can include an additional layer of non-woven material. The cellophane layer can be adjacent to cathode 12. Preferably, the non-woven material contains from about 78 weight percent to about 82 weight percent polyvinylalcohol (PVA) and from about 18 weight percent to about 22 weight percent rayon and a trace amount of surfactant. Such non-woven materials are available from PDM under the tradename PA25. An example of a separator including a layer of cellophane and a non-woven material is Duralam DT225 (Duracell Inc., Aarschot, Belgium).

In yet other embodiments, separator 16 can be an ion-selective separator. The ion-selective separator can include a microporous membrane substrate and an ion-selective polymeric coating. In some cases, such as in rechargeable alkaline manganese dioxide cells, diffusion of soluble zincate ion, i.e., $[Zn(OH)_4]^{2-}$, from the anode to the cathode can interfere with the reduction and oxidation of manganese dioxide, thereby resulting in a loss of coulombic efficiency and ultimately in decreased cycle life. Separators that can selectively inhibit the passage of zincate ions, while allowing free passage of hydroxide ions are described in U.S. Pat. Nos. 5,798,180 and 5,910,366. An example of a separator includes a polymeric substrate having a wettable cellulose acetate-coated polypropylene microporous membrane (e.g., Celgard® 3559, Celgard® 5550, Celgard® 2500, and the like) and an ion-selective coating applied to at least one surface of the substrate. Suitable ion-selective coatings include polyaromatic ethers (such as a sulfonated derivative of poly(2,6-dimethyl-1,4-phenyleneoxide)) having a finite number of recurring monomeric phenylene units each of which can be substituted with one or more lower alkyl or phenyl groups and a sulfonic acid or carboxylic acid group. In addition to preventing migration of zincate ions to the manganese dioxide cathode, the selective separator as described in U.S. Pat. Nos. 5,798,180 and 5,910,366 as capable of diminishing diffusion of soluble ionic species away from the cathode during discharge.

Alternatively or in addition, the separator can prevent substantial diffusion of soluble bismuth species (e.g., bismuthate, $BiO_3^{1-}$, $BiO_2^{1-}$, $Bi(OH)_4^{1-}$) away from the cathode to the zinc anode, such as the separator described in U.S. Pat. No. 5,952,124. The separator can include a substrate membrane such as cellophane, nylon (e.g., Pellon® sold by Freundenburg, Inc.), microporous polypropylene (e.g., Celgard® 3559 sold by Celgard, Inc.) or a composite material including a dispersion of a carboxylic ion-exchange material in a microporous acrylic copolymer (e.g., PD2193 sold by Pall-RAI, Inc.). The separator can further include a polymeric coating thereon including a sulfonated polyaromatic ether, as described in U.S. Pat. Nos. 5,798,180; 5,910,366; and 5,952, 124.

In other embodiments, separator 16 can include an adsorptive or trapping layer. Such a layer can include inorganic particles that can form an insoluble compound or an insoluble complex with soluble bismuth species (e.g., bismuthate, $BiO_3^{1-}$, $BiO_2^{1-}$, $Bi(OH)_4^{1-}$) to limit diffusion of the soluble bismuth species through the separator to the anode. The inorganic particles can include metal oxide nanoparticles, for example, as $ZrO_2$ and $TiO_2$. Although such an adsorptive separator can attenuate the concentration of the soluble bismuth species, it may become saturated and lose effectiveness when high concentrations of soluble bismuth species are adsorbed. An example of such an adsorptive separator is disclosed in commonly assigned U.S. Ser. No. 10/682,740, filed on Oct. 9, 2003, and entitled "Separator for Battery".

Cell housing 18 can be any conventional housing commonly used for primary alkaline batteries. The housing typically includes an inner metal wall and an outer electrically non-conductive material such as heat shrinkable plastic. Optionally, a layer of conductive material can be disposed between the inner wall of the housing and cathode 12. This layer may be disposed along the inner surface of the wall, along the circumference of cathode 12 or both. This conductive layer can be formed, for example, of a carbonaceous material. Such materials include LB1000 (Timcal, Ltd.), Eccocoat 257 (W. R. Grace & Co.), Electrodag 109 (Acheson Colloids, Co.), Electrodag 112 (Acheson) and EB0005 (Acheson). Methods of applying the conductive layer are disclosed in, for example, Canadian Patent No. 1,263,697, which is hereby incorporated by reference.

Current collector 20 is made from a suitable metal, such as brass. Seal 22 can be made, for example, of nylon.

Battery 10 can be assembled using conventional methods. In some embodiments, positive electrode 12 can be formed by a pack and drill method, described in U.S. Ser. No. 09/645, 632, filed Aug. 24, 2000.

Battery 10 can be, for example, AA, AAA, AAAA, C, or D battery. In other embodiments, battery 10 can be non-cylindrical, such as coin cells, button cells, prismatic cells, flat cells, bag cells or racetrack shaped cells.

In other embodiments, a portion or all of the pentavalent bismuth in the bismuth-containing metal oxides can be substituted by one or more other pentavalent metals. Other suitable pentavalent metals include $Sb^{+5}$, $Nb^{+5}$, $Ta^{+5}$, and/or $V^{+5}$. Pentavalent metal oxides and pentavalent bismuth-containing metal oxides can form solid solutions having rutile, trirutile, fluorite, pyrochlore, or perovskite-type structures or other related structures. The substituted metal oxides or solid solutions of metal oxides can be either p-type or n-type semiconductors. Examples of such materials include $ZnBi_{2-x}Nb_xO_6$ and $ZnBi_{2-x}Sb_xO_6$, and $MgBi_{2-x}Ta_xO_6$, where x=0<x<2. Trivalent bismuth may also be present in such materials as a minor constituent.

The following examples are illustrative and not intended to be limiting.

EXAMPLE 1

Five (5.00) grams of sodium bismuthate hydrate ($NaBiO_3 \cdot 1.15H_2O$, Fluka, Germany, ≧85% purity) and 50 ml of an 0.398M zinc nitrate ($Zn(NO_3)_2$) aqueous solution were mixed with an additional 20 ml deionized water and sealed in a PTFE-lined 125 ml pressure vessel. The pressure vessel was heated to and held at 95° C. for 4.5 days. The pressure vessel was cooled to room temperature before opening.

A solid was separated from the liquid by vacuum filtration. The solid was washed by dispersing in 400 ml de-ionized water, stirring, and collecting the solid by centrifugation. The washing process was repeated three times. The washed solid was dried at 90° C. for 3 hours in vacuo to yield a reddish brown powder.

The powder was characterized using X-ray powder diffraction, chemical analysis, and thermal analysis. The X-ray powder diffraction pattern of the powder was consistent with that reported for trirutile $ZnBi_2O_6$. The lattice parameters were refined in the tetragonal space group $P4_2/mnm$. The calculated values (a=4.8437(4) Å and c=9.7420(1) Å) corresponded well with the reported values (a=4.8386(1) Å and c=9.7422(3) Å). The calculated crystallographic density, $d_x$=8.44 g/cm$^3$ agreed well with the reported experimental specific gravity of 8.36 g/cm$^3$. The Zn:Bi atom ratio of 1.05:2.00, determined by inductively-coupled plasma (ICP) spectroscopy (FIG. 3), was consistent with that for a trirutile structure. Thermal analysis of $ZnBi_2O_6$ by differential thermal analysis and thermogravimetric analysis (DTA/TGA) at a heating rate of 10° C./min to 550° C. in flowing air revealed a weight loss that started below about 300° C., which is believed to correspond to the decomposition of $ZnBi_2O_6$ to ZnO and $Bi_2O_3$ accompanied by oxygen loss. The experimentally observed weight loss of 5.6 weight percent corresponded closely to the calculated weight loss of 5.52 weight percent.

To increase the electrical conductivity of a cathode formed with the $ZnBi_2O_6$ powder, a thin coating of CoOOH was deposited onto the surface of the $ZnBi_2O_6$ particles. A solution containing 0.272 g cobalt sulfate hydrate ($CoSO_4 \cdot 6.9H_2O$, Alfa-Aesar) dissolved in 20 ml of de-ionized water was added with stirring to a 500 ml flask containing a solution of 9.12 g ammonium peroxydisulfate, $(NH_4)_2S_2O_8$ (Alfa-Aesar, ≧98%) dissolved in 100 ml of de-ionized water and heated to 77° C. A slurry containing 9.765 g $ZnBi_2O_6$ powder mixed with a small amount of de-ionized water was added with vigorous stirring to the heated solution containing the $CoSO_4 \cdot 6.9H_2O$ and $(NH_4)_2S_2O_8$. After stirring for 10 minutes at 77° C., 30 ml of 0.766M $NH_4OH$ solution was added to raise the pH. The stirred mixture was held at 77° C. for another hour and then allowed to cool to room temperature. A dark brown solid was separated by vacuum filtration, washed, and dried in vacuo at 60° C. for about 2 hours.

The fresh discharge performance of both un-coated (Example 1a) and CoOOH-coated $ZnBi_2O_6$ (Example 1b) was evaluated in 635-type alkaline button cells. Cathode mixtures were prepared by mixing about 6.00 g (60 weight percent) of the $ZnBi_2O_6$ active material with 3.50 g of natural graphite (Nacional de Grafite, type MP-0702x), and 0.50 g of an electrolyte solution containing 38 weight percent KOH and about 2 weight percent ZnO using a mortar and pestle. Cathode disks weighing nominally 0.45 g were pressed directly onto a fine nickel wire grid welded to the bottom of the cathode cans using an applied pressure of 5,000 lbs. A separator disk including a layer of cellophane laminated onto a non-woven layer was wetted with electrolyte and placed on top of the cathode disk. A plastic seal was positioned on the anode can and 2.50 g of gelled zinc slurry containing 60 weight percent zinc alloy particles, 39.5 weight percent electrolyte solution, and about 0.5 weight percent gelling agent was added to the can. The cell was closed and hermetically sealed by crimping. Multiple button cells were fabricated for each sample. Cells were typically stored for 24 hours at room temperature before discharging to ensure complete wetting of the cathode and separator by the electrolyte.

Figure 4:
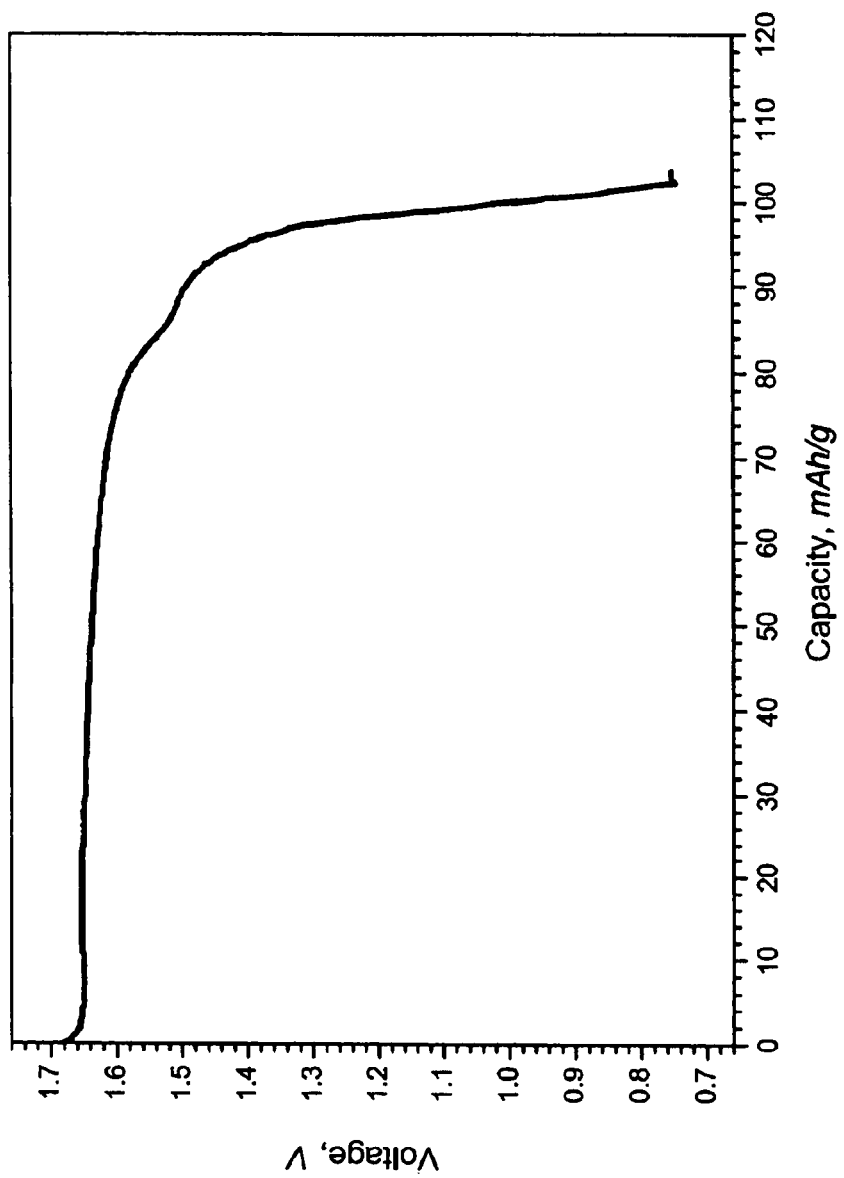
FIG. 4 is a discharge curve at a constant rate of nominally 15 mA/g for cobalt oxyhydroxide-coated $ZnBi_2O_6$ in an alkaline button cell discharged to a 0.8 V cutoff voltage.
Figure 5:
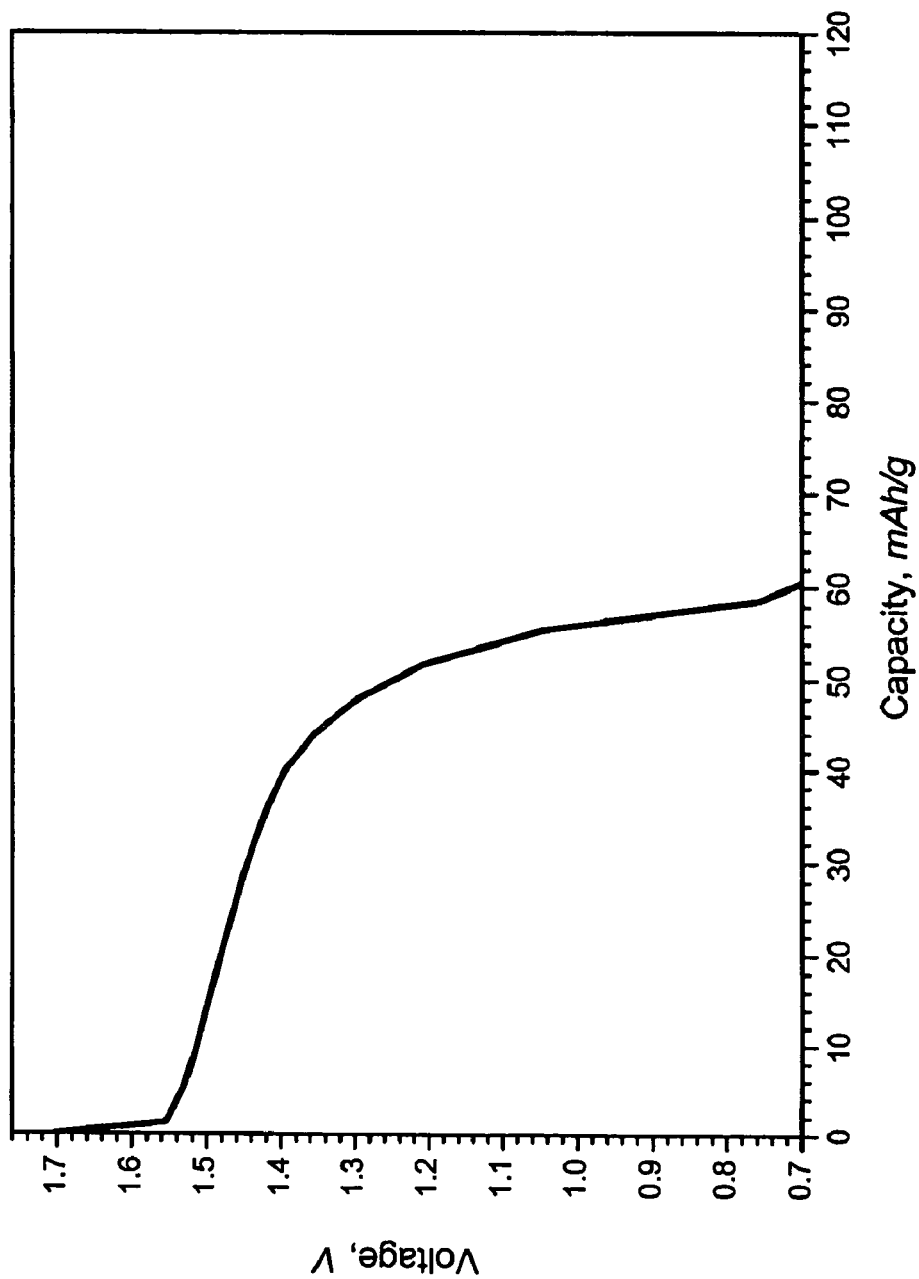
FIG. 5 is a discharge curve at a constant rate of nominally 150 mA/g for cobalt oxyhydroxide-coated $ZnBi_2O_6$ in an alkaline button cell discharged to a 0.8 V cutoff voltage.
Figure 6:
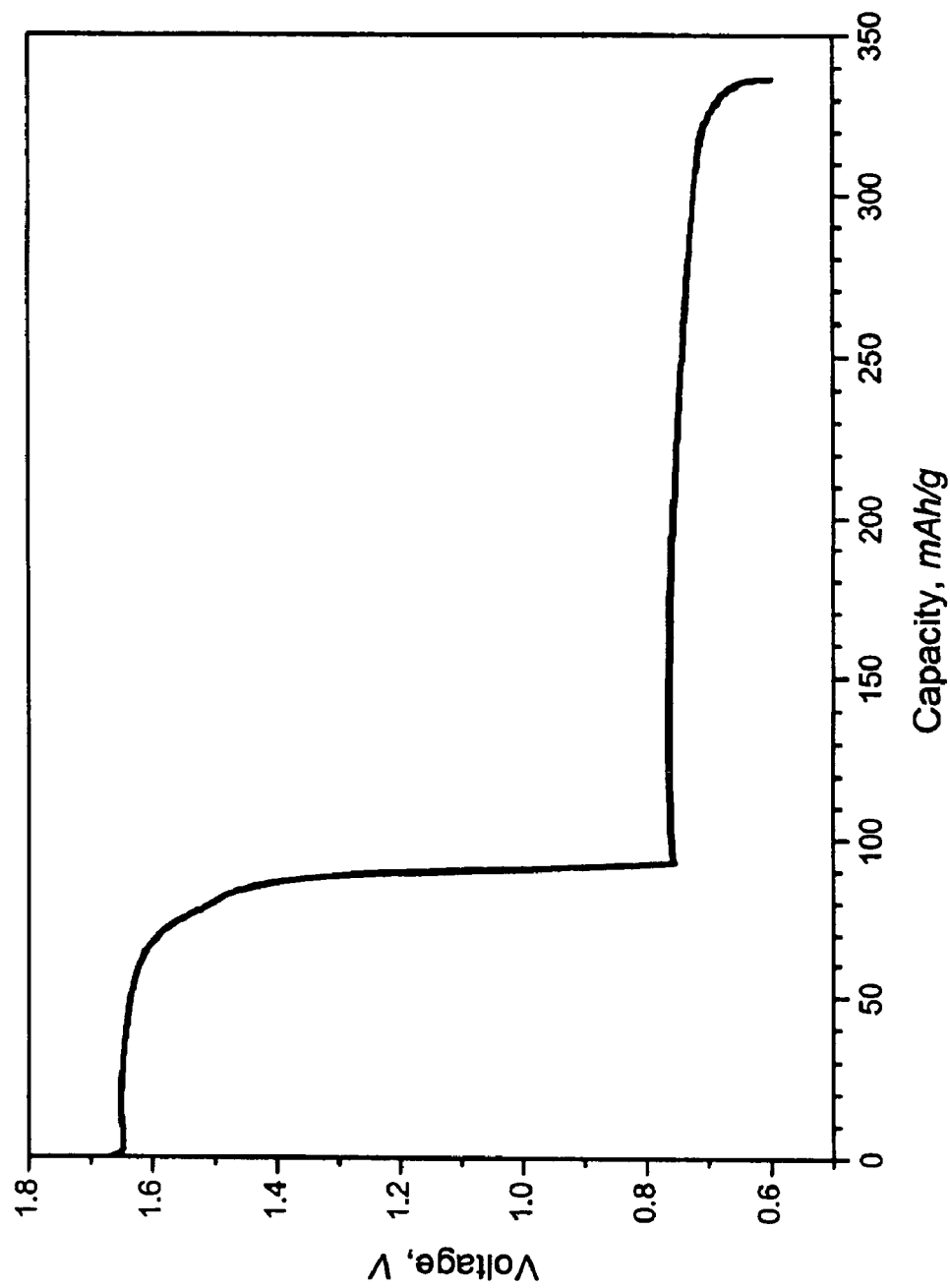
FIG. 6 is a discharge curve at a constant rate of nominally 15 mA/g for cobalt oxyhydroxide-coated $ZnBi_2O_6$ in an alkaline button cell discharged to a 0.6 V cutoff voltage.

The cell discharge data are shown in FIGS. 4-6. Cells having cathodes containing uncoated $ZnBi_2O_6$ had an average specific capacity of <10 mAh/g when discharged at low rates (e.g., 10 mA/g of $ZnBi_2O_6$) to a 0.8 V cutoff voltage. For cells having 3 weight percent CoOOH-coated $ZnBi_2O_6$, the low rate capacity increased to about 100 mAh/g to a 0.8 V cutoff voltage, which corresponds to about 55% of the theoretical four-electron (i.e., 2 electrons/Bi) specific capacity of 185 mAh/g calculated for $ZnBi_2O_6$ (FIG. 7). The average OCV after 24 hours rest was about 1.70 V. Some low-rate discharge curves for the button cells of Example 1b containing CoOOH-coated $ZnBi_2O_6$ discharged at a nominal 15 mA/g (i.e., C/30) rate to a 0.8 V cutoff voltage are shown in FIG. 4. The average low-rate running voltage was 1.65 V. Typical high-rate discharge curves for button cells discharged at a nominal 150 mA/g (i.e., 0.8C) rate to a 0.8 V cutoff voltage are shown in FIG. 5. The average high-rate running voltage was about 1.45 V. X-ray powder diffraction analysis of the cathode after continuous discharge to 0.8 V cutoff voltage revealed the presence of graphite, $Bi_2O_3$, zinc oxide, and bismuth metal. Typical low-rate discharge curves for button cells discharged at a nominal 10 mA/g (i.e., C/30) rate to a 0.6 V cutoff voltage are shown in FIG. 6. A second discharge plateau having an average running voltage of about 0.76 V was present. The total specific capacity for the two plateaus was about 335 mAh/g, which represents about 70% of the theoretical ten-electron capacity (i.e., 5 electrons/Bi) calculated for $ZnBi_2O_6$. X-ray powder diffraction analysis of cathodes discharged to a 0.6 V cutoff voltage revealed graphite, bismuth metal, and zinc oxide to be present, but no $Bi_2O_3$. The low-rate specific capacities to a 0.8 V cutoff voltage (i.e., upper plateau only) and to a 0.6 V cutoff voltage (i.e., upper and lower plateaus combined) for cells of Examples 1a and 1b are given in FIG. 7.

EXAMPLE 2

Five (5.00) g of sodium bismuthate hydrate ($NaBiO_3 \cdot 1.37H_2O$, Aldrich, ACS reagent) and 13.35 g magnesium chloride hexahydrate ($MgCl_2 \cdot 6H_2O$, Alfa-Aesar, 99-102%) were mixed with about 60 ml of de-ionized water and sealed in a PTFE-lined 125 ml pressure vessel. The pressure vessel and contents were heated to and held at 135° C. for 2.5 days. The pressure vessel was cooled to room temperature before opening.

A solid was separated from the liquid by vacuum filtration and washed with several portions of de-ionized water. The solid was washed further by dispersing it in 1000 ml of de-ionized water, stirring for 30 minutes, and collecting the solid by vacuum filtration. The washing process was repeated. The washed solid was dried in air at room temperature, at about 95-105° C. for 4 hours in vacuo, and finally at 115° C. for about 14 hours to yield a dark brown powder.

The powder was characterized using X-ray powder diffraction, chemical analysis, and thermal analysis. The X-ray powder diffraction pattern was consistent with that reported for trirutile $MgBi_2O_6$. The lattice parameters were refined in the tetragonal space group $P4_2/mnm$. The values obtained (a=4.82168(3) Å and c=9.71194(8) Å) corresponded closely to the reported values (a=4.8187(1) Å and c=9.7067(2) Å). The calculated crystallographic density, $d_x$=7.92 g/cm$^3$ agreed well with the reported experimental specific gravity of 7.96 g/cm$^3$. The Mg:Bi atom ratio of 1.02:2.00, determined by ICP spectroscopy (FIG. 3), was consistent with that of a trirutile structure. Thermal analysis of $MgBi_2O_6$ by DTA/TGA (10° C./min to 550° C.) revealed a weight loss starting below about 400° C. in flowing air corresponding to a decomposition to MgO and $Bi_2O_3$ accompanied by oxygen loss. The experimentally observed weight loss of 5.91 weight percent closely corresponded to the calculated weight loss of 5.94 weight percent.

To increase the electrical conductivity of a cathode formed of the $MgBi_2O_6$ powder, a thin coating of CoOOH was deposited onto the surface of the $MgBi_2O_6$ particles. A slurry containing 9.43 g $MgBi_2O_6$ powder mixed with a small amount of de-ionized water was added with stirring to 50 ml of aqueous 0.8 M ammonium peroxydisulfate, $(NH_4)_2S_2O_8$ (Alfa-Aesar, ≧98%) solution and heated at 74-76° C. in a 500 ml flask. Twenty (20) ml of aqueous 0.175 M cobalt sulfate hydrate ($CoSO_4 \cdot 6.9H_2O$, Alfa-Aesar) solution was added with stirring to the mixture of $MgBi_2O_6$ and ammonium peroxydisulfate. After stirring for about 15 minutes at 75° C., 40 ml of 5.0 M KOH solution was added to increase pH≧14, and stirring was continued for an additional 45 minutes. The mixture was allowed to cool to room temperature. A dark brown solid was separated from the clear liquid by vacuum filtration, washed thoroughly, and dried in vacuo at 90-115° C. for about 2 hours.

The fresh discharge performance of both un-coated (Example 2a) and CoOOH-coated $MgBi_2O_6$ (Example 2b) was evaluated in 635-type alkaline button cells. Cathode mixtures were prepared by mixing about 7.50 g of the $MgBi_2O_6$ (75 weight percent) active material with 2.00 g of natural graphite (Nacional de Grafite, type MP-0702x), and 0.50 g of an electrolyte solution containing 38 weight percent KOH and about 2 weight percent ZnO using a mortar and pestle. Multiple button cells were fabricated as described in Example 1 for each sample. Cells typically were stored for 24 hours at room temperature before discharge.

Figure 8:
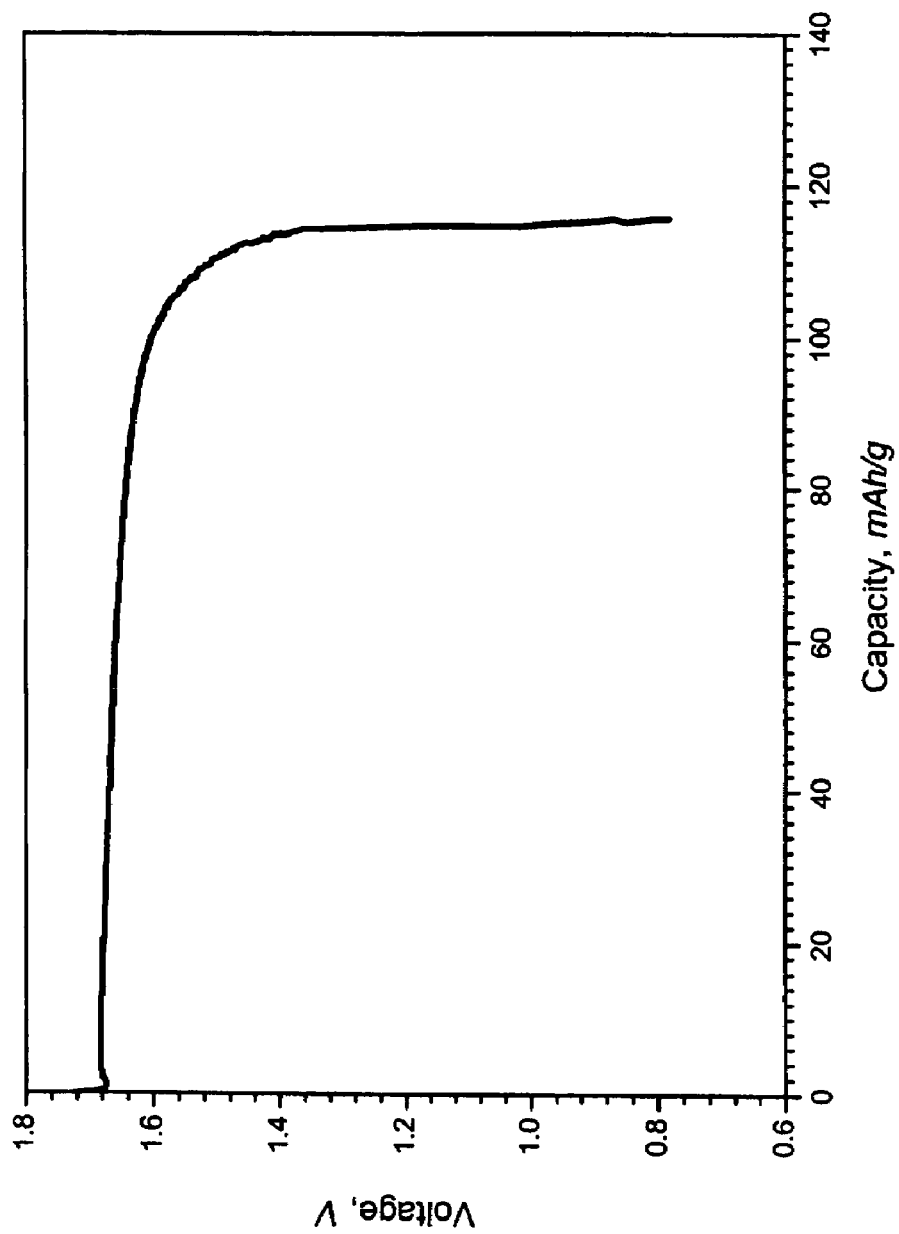
FIG. 8 is a discharge curve at a constant rate of nominally 10 mA/g for cobalt oxyhydroxide coated $MgBi_2O_6$ in an alkaline button cell discharged to a 0.8 V cutoff voltage.
Figure 9:
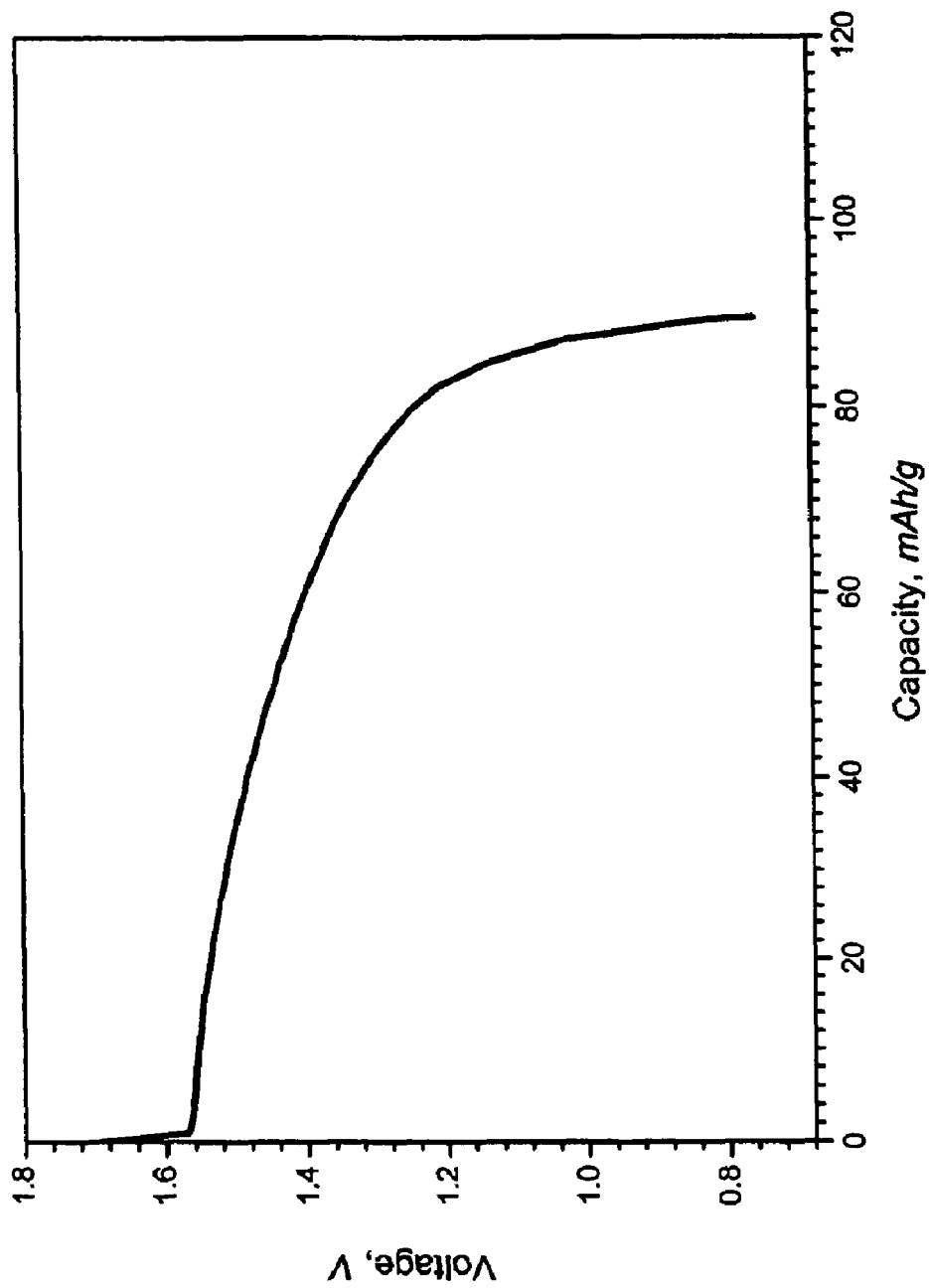
FIG. 9 is a discharge curve at a constant rate of nominally 150 mA/g for cobalt oxyhydroxide coated $MgBi_2O_6$ in an alkaline button cell discharged to a 0.8 V cutoff voltage.
Figure 10:
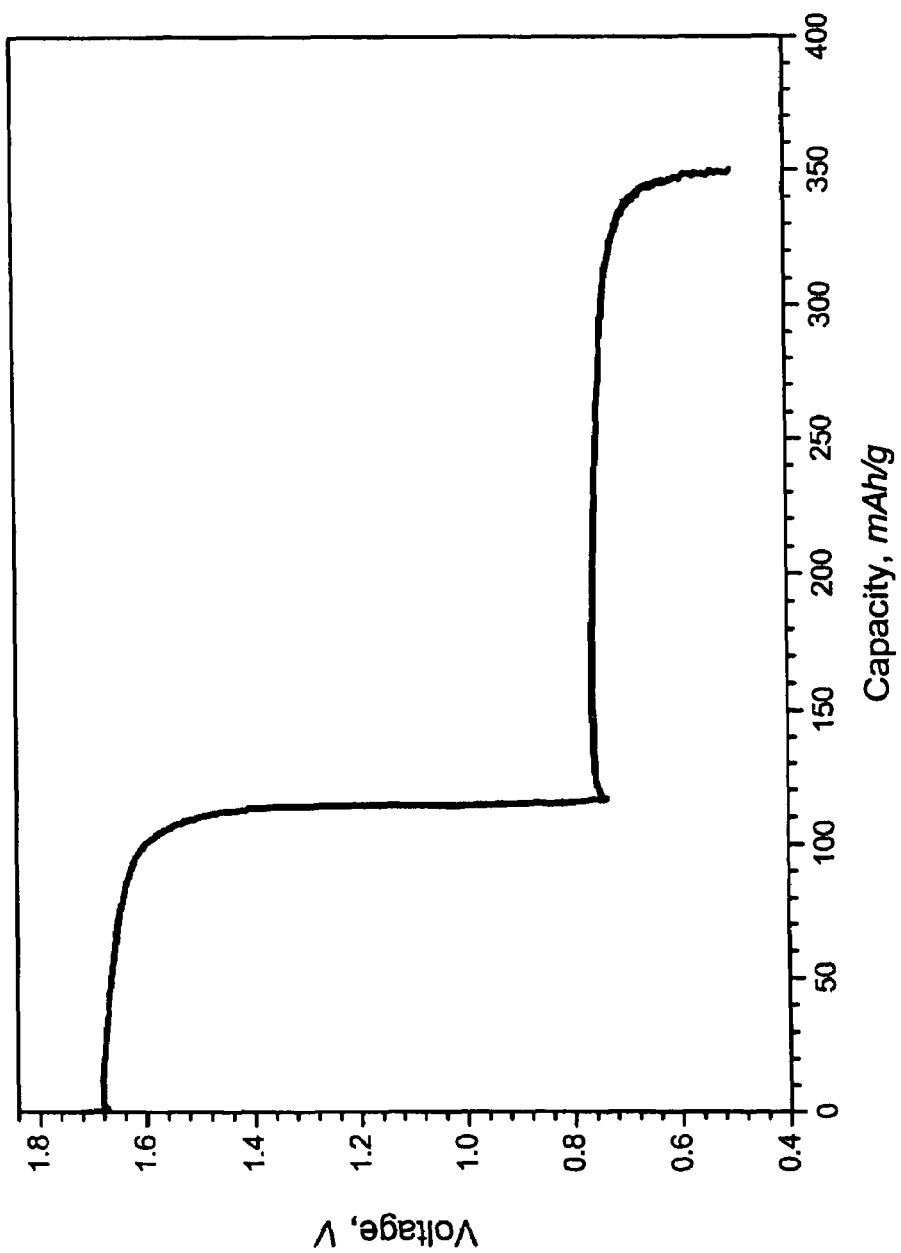
FIG. 10 is a discharge curve at a constant rate of nominally 10 mA/g for cobalt oxyhydroxide coated $MgBi_2O_6$ in an alkaline button cell discharged to a 0.6 V cutoff voltage.

The cell discharge data are shown in FIGS. 8-10. The average OCV after 24 hours storage at room temperature was about 1.70 V. Typical low-rate discharge curves for button cells of Example 2b containing CoOOH-coated $MgBi_2O_6$ discharged at a nominal 10 mA/g (i.e., C/30) rate to a 0.8 V cutoff voltage are shown in FIG. 8. The low-rate specific capacity was about 115 mAh/g, which corresponds to about 60% of the theoretical four-electron capacity (2 electrons/Bi) of 199 mAh/g calculated for $MgBi_2O_6$. The average low-rate running voltage was about 1.68 V. Typical high-rate discharge curves for button cells of Example 2b discharged at a nominal 150 mA/g (i.e., 0.8C) rate to a 0.8 V cutoff voltage are shown in FIG. 9. The average high-rate running voltage was about 1.48 V. Typical low-rate discharge curves for button cells of Example 2b discharged at a nominal 10 mA/g (i.e., C/30) rate to a 0.6 V cutoff voltage are shown in FIG. 10. The total specific capacity was extended to about 345 mAh/g, which corresponds to about 70% of the theoretical 10-electron specific capacity of 498 mAh/g. A second discharge plateau having an average running voltage of about 0.76 V was present. The low-rate and high-rate specific capacities to a 0.8 V cutoff voltage (i.e., upper voltage plateau only) and to a 0.6 V cutoff voltage (i.e., upper and lower voltage plateaus combined) for cells of Examples 2a and 2b are given in FIG. 7.

EXAMPLE 3

Five (5.00) g of sodium bismuthate hydrate ($NaBiO_3 \cdot 1.15H_2O$, Fluka, Germany; ≧85% purity) and 4.83 g copper nitrate ($Cu(NO_3)_2 \cdot 3H_2O$) were mixed with 60 ml deionized water and sealed in a PTFE-lined 125 ml pressure vessel. The pressure vessel was heated to and held at 125° C. for 4.5 days. The pressure vessel was cooled to room temperature before opening.

A solid was separated from a blue-colored clear liquid by decantation. The solid was washed completely by dispersing in 500 ml of de-ionized water, stirring, and collecting the solid by vacuum filtration. The washing process was repeated three times. The washed solid was dried at about 95° C. for 5 hours in vacuo to yield a reddish brown powder.

The solid was characterized using X-ray powder diffraction, chemical analysis, and thermal analysis. The X-ray powder diffraction pattern for the solid was not consistent with a trirutile-type structure. It is hypothesized that the structure was more closely related to a defect pyrochlore structure or a defect fluorite structure. Further, the Cu:Bi atom ratio as determined by ICP spectroscopy was about 1.50:2.00, rather than 1.00:2.00 as for a trirutile structure. The residual sodium content was determined to be negligible (FIG. 3). Thermal analysis of the solid using DTA/TGA (10° C./min to 550° C.) revealed a weight loss starting at about 300° C. in flowing air, possibly corresponding to a decomposition to CuO and $Bi_2O_3$ accompanied by oxygen loss. However, the total weight loss of 11.64 weight percent substantially exceeded the calculated weight loss of 4.87 weight percent corresponding to formation of CuO, $Bi_2O_3$, and oxygen. This data suggested that the solid was likely hydrated having water present in the crystal lattice.

Figure 11:
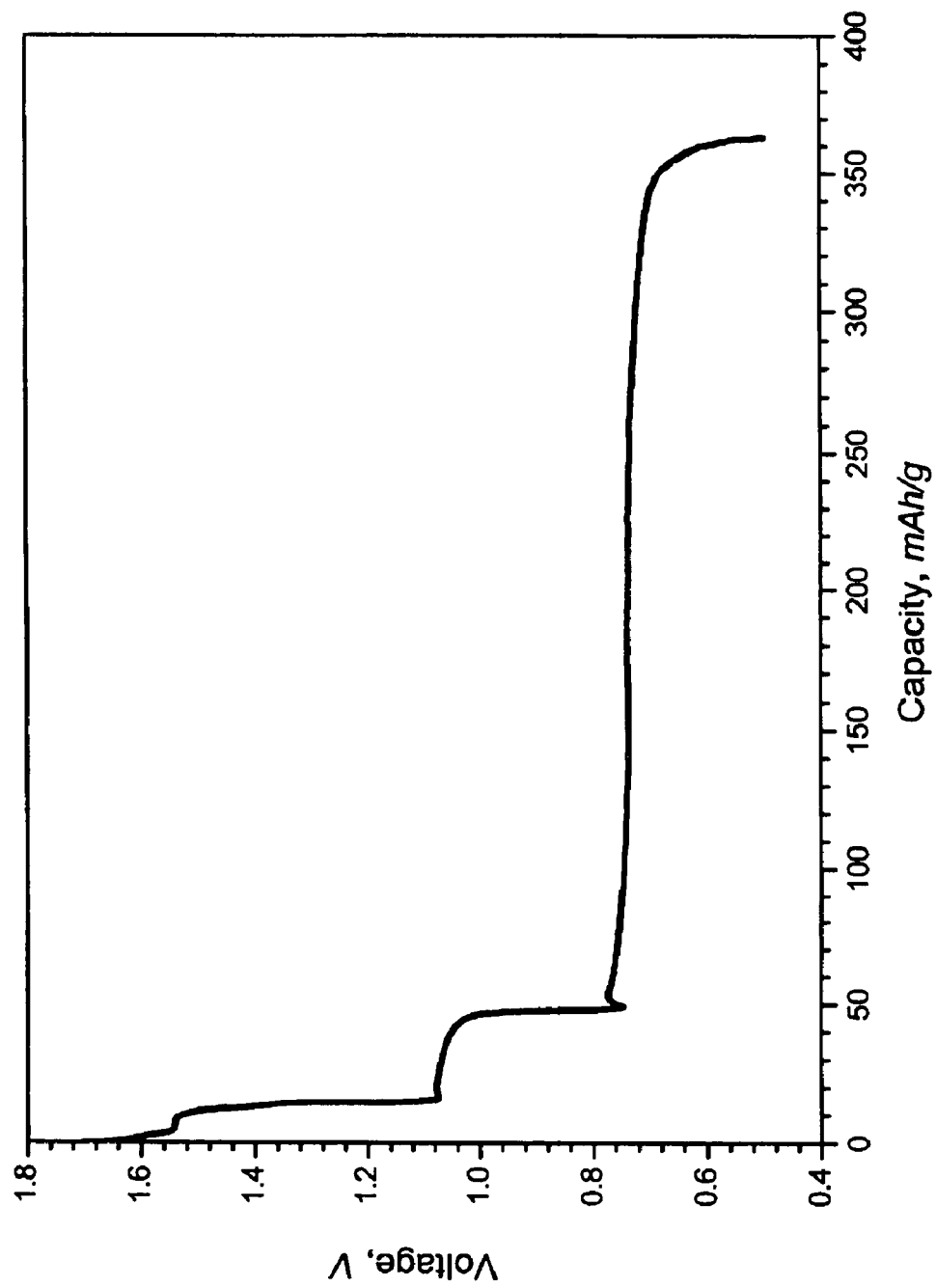
FIG. 11 is a discharge curve at a constant rate of nominally 10 mA/g for "$Cu_2Bi_2O_7$" in an alkaline button cell discharged to a 0.6 V cutoff voltage.

The fresh discharge performance of the hydrated solid was evaluated in 635-type alkaline button cells. Cathode mixtures were prepared and cells fabricated as described in Example 1. Cells typically were stored for about 24 hours at room temperature before discharge. Typical low-rate discharge curves for button cells containing the solid discharged at a nominal 10 mA/g (i.e., C/30) rate to a 0.6 V cutoff voltage are shown FIG. 11. The total specific capacity was about 360 mAh/g, which corresponds to about 63 percent of the theoretical 14-electron specific capacity of 571 mAh/g. The average OCV after 24 hours storage at room temperature was about 1.70 V. Three distinct voltage plateaus were evident in the low-rate discharge curve. The nominal average running voltages for the upper, middle, and lower plateaus were about 1.5-1.6 V, 1.06 V, and 0.74 V, respectively. It is hypothesized that the upper discharge plateau corresponds to the reduction of $Bi^{5+}$ to $Bi^{3+}$, the middle plateau to the reduction of $Cu^{2+}$ to $Cu^{+}$, and the lowest plateau to the combined reduction of $Bi^{3+}$ to $Bi^0$ and $Cu^+$ to $Cu^0$. At high discharge rates (e.g., 150 mA/g), the highest discharge plateau was absent and the two lower plateaus were observed at about 0.9 V and 0.65 V. The total specific capacities for cells discharged at low and high-rates are given in FIG. 7.

EXAMPLE 4

Five (5.00) g of sodium bismuthate hydrate ($NaBiO_3 \cdot 1.37H_2O$, Aldrich, ACS Reagent grade) and 100 ml of 0.5 M silver nitrate ($AgNO_3$, Alfa-Aesar, ACS Reagent grade) solution were mixed and sealed in a PTFE-lined 125 ml pressure vessel. The pressure vessel was heated to and held at about 80° C. for 22 hours. The pressure vessel was cooled to room temperature before opening.

A solid was separated from the liquid by vacuum filtration and washed with several portions of de-ionized water. The solid was washed further by dispersing it in 1500 ml of de-ionized water, stirring for 30 minutes, and collecting the solid by vacuum filtration. The washing process was repeated twice. The washed solid was dried in air at room temperature, at about 95-105° C. for 4 hours in vacuo, and finally at about 80° C. for 16 hours to yield a black powder. The solid was stored in an amber bottle to protect it from light.

The solid was characterized using X-ray powder diffraction, chemical analysis, and thermal analysis. The X-ray powder diffraction pattern was consistent with that reported for silver bismuthate, $AgBiO_3$, having an ilmenite-type structure. The lattice parameters were refined in the rhombohedral space group R$\bar{3}$. The lattice parameters (a=5.6353(6) Å and c=16.094(2) Å) corresponded well to the reported values (a=5.641(1) Å and c=16.118(2) Å). The calculated crystallographic density, $d_x$=8.21 g/cm$^3$ agreed well with the reported crystallographic density, $d_x$=8.18 g/cm$^3$. The Ag:Bi atom ratio of 1.02:1.00, determined by ICP spectroscopy (FIG. 3), was consistent with that of an ilmenite-type structure. Thermal analysis of $AgBiO_3$ using DTA/TGA at a heating rate of 10° C./min to 550° C. in flowing air revealed a weight loss starting below about 200° C. corresponding to decomposition of $AgBiO_3$ to Ag and $Bi_2O_3$ accompanied by oxygen evolution. The experimentally observed total weight loss of 6.68 weight percent was consistent with the calculated weight loss of 6.58 weight percent.

Figure 12:
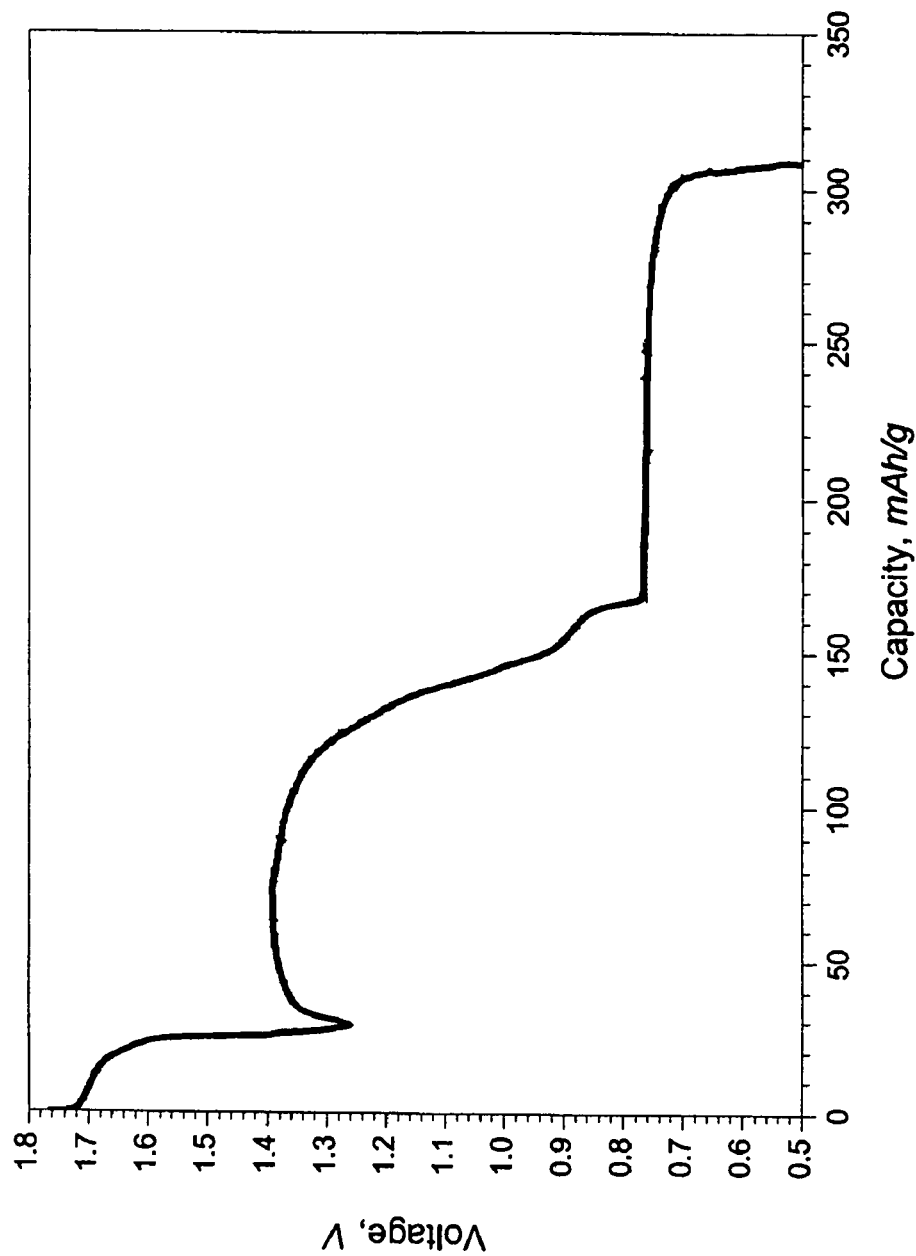
FIG. 12 is a discharge curve at a constant rate of nominally 10 mA/g for $AgBiO_3$ in an alkaline button cell discharged to a 0.6 V cutoff voltage.

The fresh discharge performance of silver bismuthate was evaluated in 635-type alkaline button cells. Cathode mixtures were prepared and cells fabricated as described in Example 1. Cells were stored for 2 hours at room temperature before discharge. Typical low-rate discharge curves for button cells containing silver bismuthate discharged at a nominal 10 mA/g (C/30) rate to a 0.6 V cutoff voltage are shown in FIG. 12. The total specific capacity was about 310 mAh/g, which corresponds to about 70 percent of the theoretical six-electron capacity of about 444 mAh/g. The average OCV after 24 hours storage at room temperature was about 1.74 V. Three distinct voltage plateaus were evident in the low-rate discharge curve. The nominal running voltages for the upper, middle, and lower plateaus were about 1.74 V, 1.36 V, and 0.77 V, respectively. However, cells stored at room temperature for 24 hours before discharging had only the two lower discharge plateaus at about 1.38 V and 0.77 V. Total specific capacities for cells discharged at the low- and high-rates are given in FIG. 7.

EXAMPLE 5

A PTFE reaction vessel containing 70 g of solid potassium hydroxide pellets (KOH, 85%, Aldrich, ACS Reagent) was placed in a furnace and heated in air to about 250° C. After the KOH had melted, 8.45 g of sodium bismuthate hydrate ($NaBiO_3.1.37H_2O$, Alfa Aesar, ACS Reagent) was added slowly to the melt with stirring. The mixture was held at 250° C. for 14 hours. The reaction vessel was removed from the furnace and before it cooled to room temperature, a clear, yellow supernatant liquid was decanted off the dark brown solid that had deposited on the bottom of the reaction vessel. The reaction vessel was allowed to cool to room temperature, about 1000 ml of de-ionized water added, and the mixture stirred for about 30 minutes.

A solid was separated from the liquid by vacuum filtration and washed with several additional portions of de-ionized water. The solid was washed further by re-dispersing it in 1000 ml of de-ionized water, stirring for 30 minutes, and collecting the solid by vacuum filtration. The washing process was repeated 4-5 times. The washed solid was dried in vacuo at 80° C. for about 5 hours to yield a dark reddish brown powder.

The solid reaction product was characterized using X-ray powder diffraction and thermal analysis. The X-ray powder diffraction pattern of the reaction product was consistent with that reported for $KBiO_3$, having a cubic $KSbO_3$-type crystal structure. The lattice parameter was refined in the cubic space group $Im\bar{3}$. The lattice parameter (a=10.0199(9) Å) corresponded to the values reported for anhydrous $KBiO_3$ (a=10.0194(6) Å) and hydrated $KBiO_3.1.45H_2O$ (a=10.0175 (2) Å). Thermal analysis of the reaction product by differential thermal analysis and thermogravimetric analysis (DTA/TGA) at a heating rate of 10° C./min to 550° C. in flowing air revealed a gradual weight loss that started at about 250° C., that is believed to correspond to the decomposition of $KBiO_3$ to $Bi_2O_3$ and $K_2O$ accompanied by oxygen loss. The experimentally observed weight loss of 5.08 weight percent is nearly consistent with the weight loss of 5.40 weight percent calculated for anhydrous $KBiO_3$.

Figure 15:
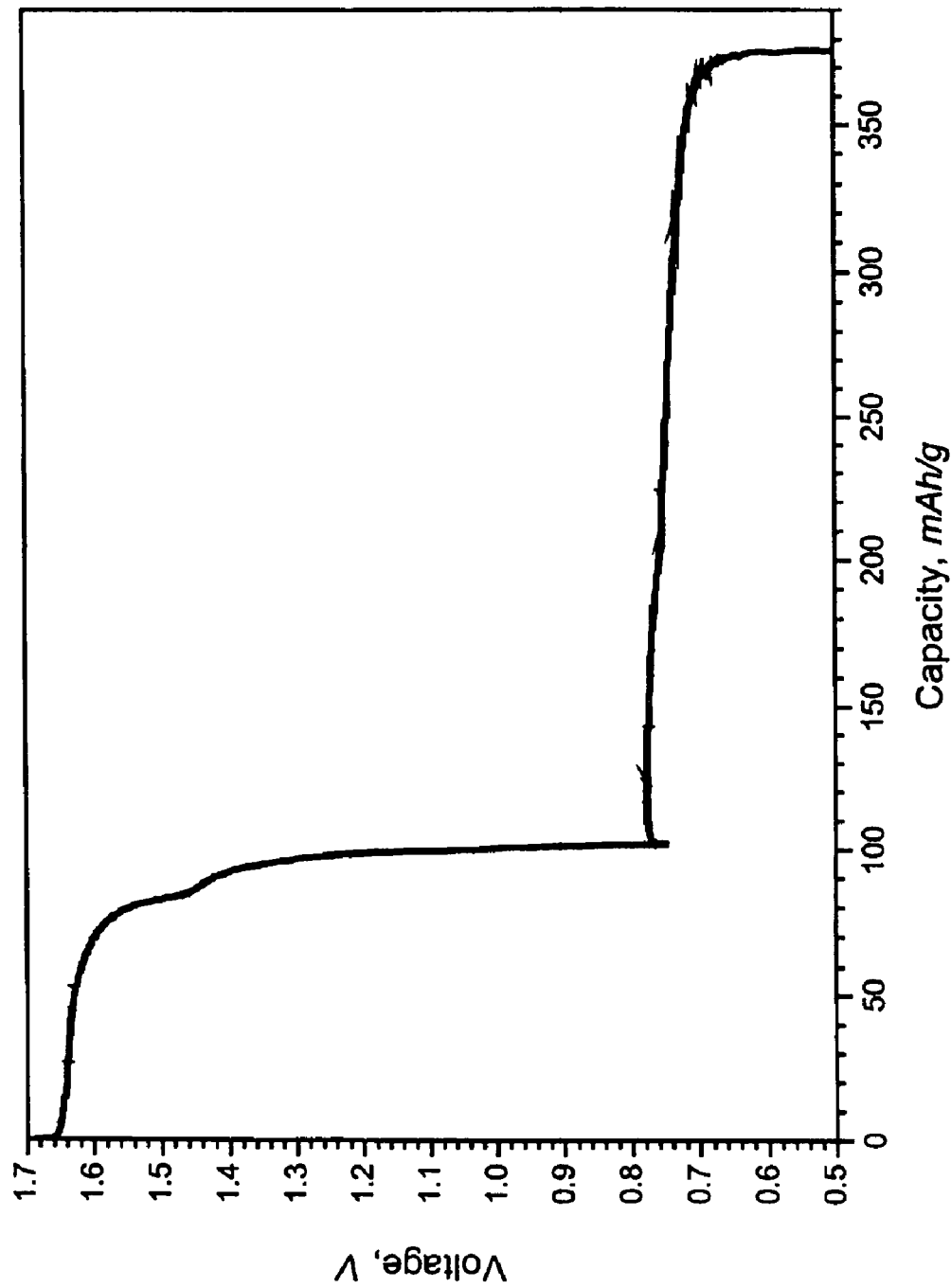
FIG. 15 is a discharge curve at a constant rate of nominally 10 mA/g for cobalt oxyhydroxide-coated $KBiO_3$ in an alkaline button cell discharged to a 0.6 V cutoff voltage.

To increase the electrical conductivity of a cathode formed of the $KBiO_3$ powder, a thin coating of CoOOH was deposited onto the surface of the $KBiO_3$ particles by a process similar to that described in Example 2. The fresh discharge performance of uncoated (Example 5a) and CoOOH-coated (Example 5b) potassium bismuthate were evaluated in 635-type alkaline button cells. Cathode mixtures were prepared and cells fabricated as described in Example 1. Cells were stored for 24 hours at room temperature before discharge. A typical low-rate discharge curve for button cells containing CoOOH-coated potassium bismuthate discharged at a nominal 10 mA/g (C/30) rate to a 0.6 V cutoff voltage is shown in FIG. 15. The average OCV after 24 hours storage at room temperature was about 1.67 V. The profile of the low-rate discharge voltage curve was very similar to that for silver bismuthate cells that had been discharged after 2 hours storage at room temperature. The total specific capacity for the potassium bismuthate cells was about 375 mAh/g, which corresponds to about 83 percent of the theoretical five-electron capacity of about 453 mAh/g. Two voltage plateaus were evident in the low-rate discharge curve. The nominal average running voltages for the upper and lower plateaus were about 1.5 V and 0.76 V, respectively. The specific capacity on the upper plateau was about 105 mAh/g, which corresponds to about 58% of the theoretical two-electron capacity of about 181 mAh/g. Total specific capacities for cells discharged at the low- and high-rates are given in FIG. 7.

COMPARATIVE EXAMPLE 1

Figure 13:
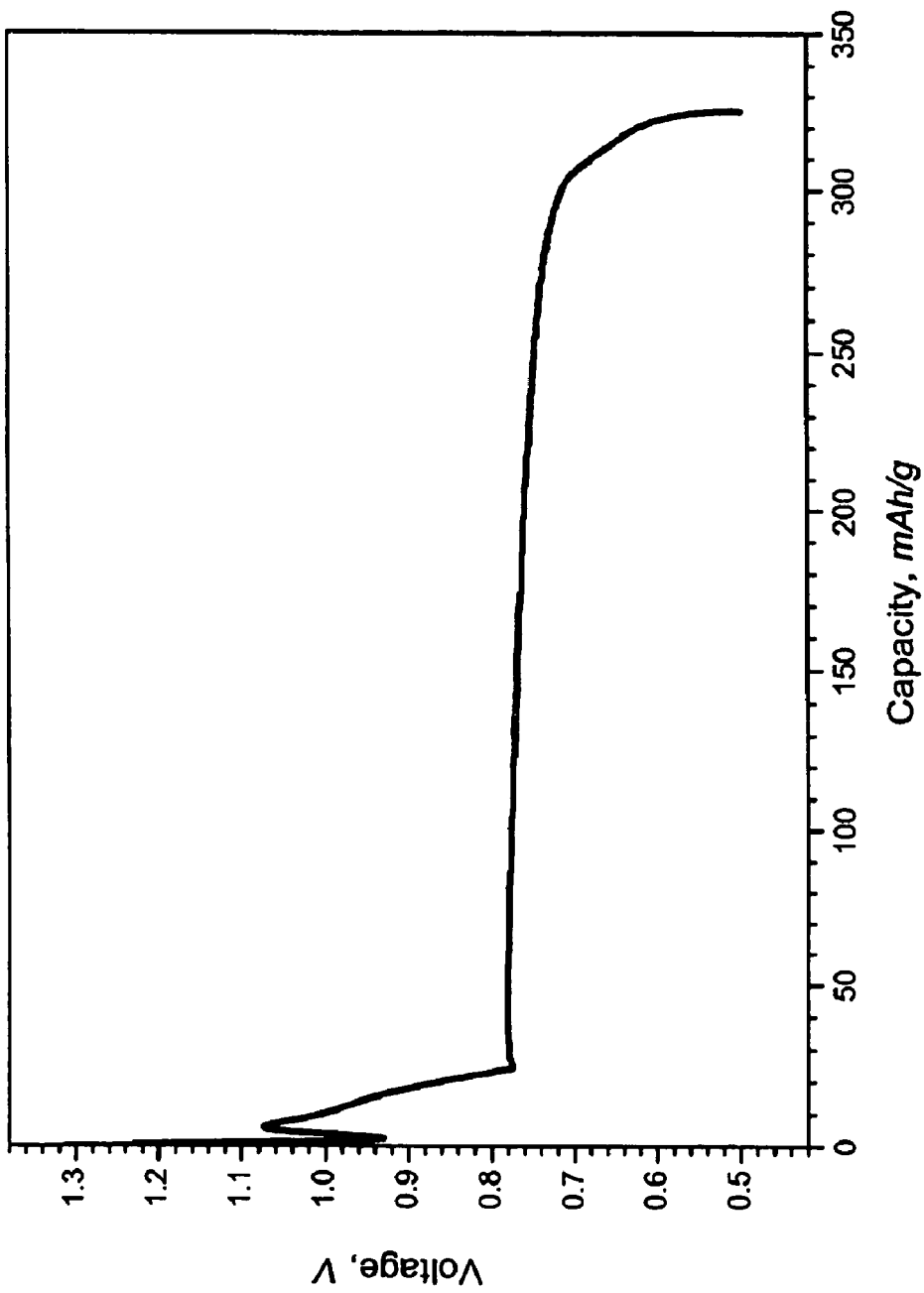
FIG. 13 is a discharge curve at a constant rate of nominally 10 mA/g for $NaBiO_3$ $1.37H_2O$ in an alkaline button cell discharged to a 0.6 V cutoff voltage.

The fresh discharge performance of sodium meta-bismuthate ($NaBiO_3.1.37H_2O$, Aldrich, ACS Reagent) was evaluated in 635-type alkaline button cells. Cathode mixtures were prepared and cells fabricated as described in Example 1. Because of the high solubility of $NaBiO_3.1.37H_2O$, cells were discharged within two hours after fabrication at a low-rate of about 10 mA/g (i.e., C/30) to a 0.6 V cutoff voltage. Two voltage plateaus were present in the discharge curve at about 1.55 V and 0.78 V. The theoretical five-electron specific capacity for $NaBiO_3.1.37H_2O$ is about 440 mAh/g. The average specific capacity for cells discharged immediately after fabrication at low-rate to a 0.6 V cutoff voltage was about 405 mAh/g, corresponding to about 92 percent of the theoretical value. The average OCV for the cells immediately after fabrication was about 1.67 V. Cells stored at room temperature for about 24 hours before discharge had only one voltage plateau at about 0.78 V as shown in FIG. 13. The average OCV for cells stored at room temperature for about 24 hours before discharge still was about 1.67 V. However, the cells had average specific capacities at low-rate to a 0.6 V cutoff voltage of about 325 mAh/g, corresponding to about 74 percent of the theoretical value. Most of the observed capacity loss resulted from the disappearance of the 1.55 V plateau possibly due, it is believed, to self-discharge of $Bi^{5+}$ via oxidation of water in the electrolyte to oxygen.

COMPARATIVE EXAMPLE 2

Four (4.00) g of sodium bismuthate hydrate ($NaBiO_3.1.37H_2O$, Aldrich, ACS reagent) and 1.328 g potassium nitrate ($KNO_3$, Alfa Aesar, 99.0%) were mixed with about 65 ml of de-ionized water and sealed in a PTFE-lined 125 ml pressure vessel. The pressure vessel was heated at 80° C. for several hours. The temperature was increased and held at 135-145° C. for about 4.5 days. The pressure vessel was cooled to room temperature before opening.

A solid was separated from the liquid by vacuum filtration and washed with several portions of de-ionized water. The solid was washed further by dispersing it in 1000 ml of de-ionized water, stirring for 30 minutes, and collecting the solid by vacuum filtration. The washing process was repeated 4-5 times. The washed solid was dried in air at room temperature for about 12 hours, then in vacuo at 115° C. for about 20 hours to yield an orange-brown powder.

The solid was characterized using X-ray powder diffraction, chemical analysis, and thermal analysis. The X-ray powder diffraction pattern of the reaction product was consistent with that for monoclinic bismuth tetroxide, $Bi_2O_4$, having a $\beta$-$Sb_2O_4$-type crystal structure. The X-ray powder diffraction pattern revealed the presence of a trace amount of unreacted $NaBiO_3 \cdot 1.37H_2O$ as well as the presence of several unassigned peaks having very low intensities. The lattice parameters were refined in the monoclinic space group C2/c to give: a=12.373(1) Å, b=5.1195(4) Å, c=5.5707(4) Å, and $\beta$=107.829(5)°. These values were consistent with the values reported for monoclinic $Bi_2O_4$ of: a=12.3668(2) Å, b=5.1180 (1) Å, c=5.5670(1) Å, and $\beta$=107.838(1)°.

Figure 14:
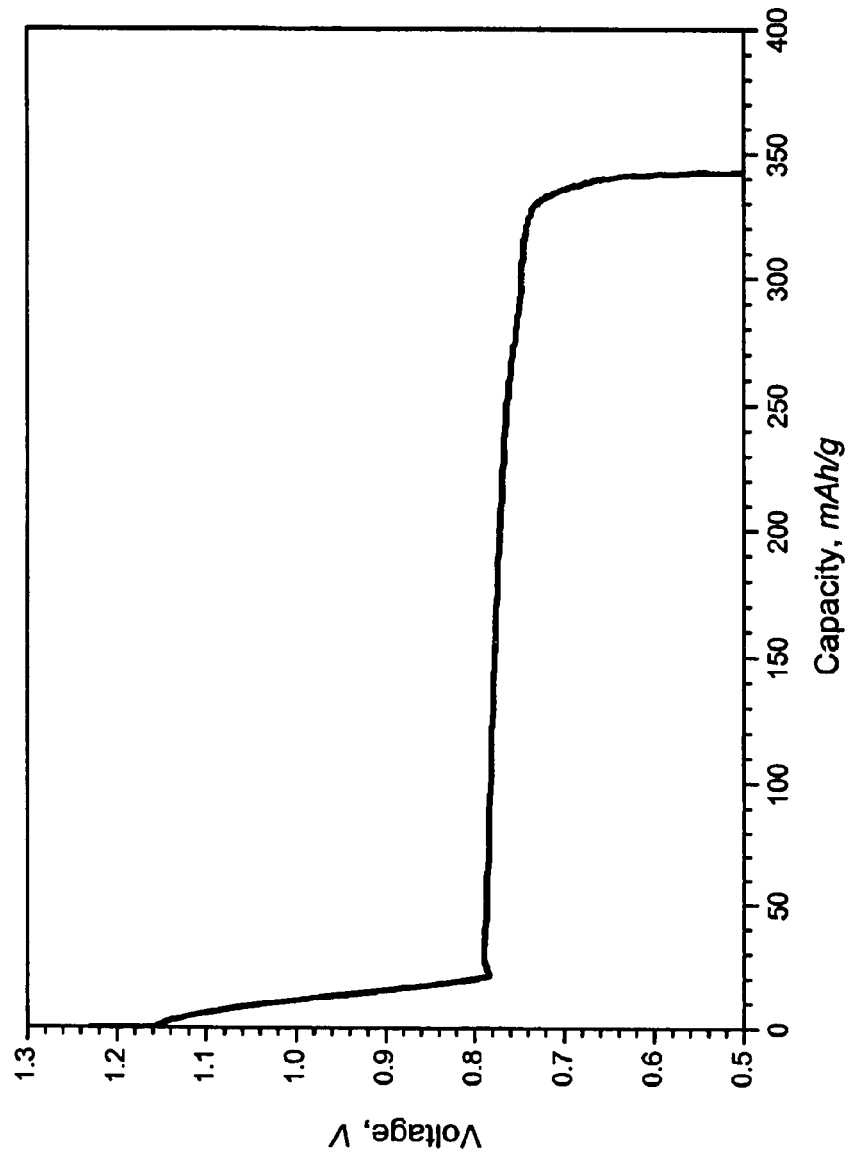
FIG. 14 is a discharge curve at a constant rate of nominally 10 mA/g for $Bi_2O_4$ in an alkaline button cell discharged to a 0.6 V cutoff voltage.

The fresh discharge performance of monoclinic $Bi_2O_4$ was evaluated in 635-type alkaline button cells. Cathode mixtures were prepared and cells fabricated as described in Example 2. Cells were stored for about 24 hours at room temperature before discharge. The average OCV after 24 hours storage at room temperature was about 1.2 V. Typical low-rate discharge curves for button cells containing monoclinic $Bi_2O_4$ discharged at a nominal 10 mA/g (i.e., C/30) rate to a 0.6 V cutoff voltage are shown in FIG. 14. Only one voltage plateau was present in the low-rate discharge curve at about 0.78 V. The eight-electron theoretical specific capacity for monoclinic $Bi_2O_4$ is about 445 mAh/g. The average specific capacity for cells discharged at low-rate to a 0.6 V cutoff voltage was about 336 mAh/g, corresponding to about 75 percent of the theoretical value.

COMPARATIVE EXAMPLE 3

Fresh discharge performance of bismuth (+3) sesquioxide, $Bi_2O_3$ (Fisher Chemical, certified) was evaluated in 635-type alkaline button cells. Cathode mixtures were prepared and cells were fabricated as described in Example 2. Cells were stored at room temperature for about 24 hours before discharge. The average OCV after 24 hours storage was about 1.10 V. Cells were discharged at a nominal low rate of 10 mA/g (i.e., C/30) to a 0.6 V cutoff voltage. A single discharge plateau was present with an average running voltage of about 0.78 V. The theoretical six-electron specific capacity for $Bi_2O_3$ is about 345 mAh/g. The average specific capacity for cells discharged at low-rate to a 0.6 V cutoff voltage was about 260 mAh/g, corresponding to about 75 percent of the theoretical value.

The alkaline cells of Examples 1b, 2b, and 5b with cathodes containing cobalt oxyhydroxide-coated $ZnBi_2O_6$, $MgBi_2O_6$, and $KBiO_3$ exhibited a substantial capacity (e.g., >100 mAh/g) on the upper voltage plateau (e.g., 1.55 to 1.65 V) when discharged continuously at both high and low rates after 24 hours storage at room temperature before discharge. Cathode utilization at low rate on the upper voltage plateau was typically greater than about 55 percent.

Cells of Example 3 with cathodes containing presumably $Cu_2Bi_2O_7$ exhibited less capacity on the upper voltage plateau (e.g., 1.5 V) when discharged at low rate after 24 hours storage at room temperature. Furthermore, the upper voltage plateau disappeared completely when fresh cells were discharged at high rate, although an intermediate voltage plateau (e.g., 0.9 V) thought to be related to reduction of $Cu^{2+}$ to $Cu^{1+}$ persisted. The decrease in capacity on the upper voltage plateau possibly can be attributed to the solubility of $Cu_2Bi_2O_7$ in alkaline electrolyte resulting in self-discharge of $Bi^{5+}$ to $Bi^{3+}$. This hypothesis is consistent with the observation that a blue coloration, i.e., attributable to $Cu(OH)_4^{2-}$ ions, developed slowly when cathodes containing $Cu_2Bi_2O_7$ were immersed in alkaline electrolyte at room temperature.

Similar discharge behavior also was observed for cells of Example 4 with cathodes containing silver bismuthate after storage at room temperature for about 24 hours. Capacity on the upper voltage plateau was greatly reduced relative to that for cells discharged fresh (i.e., within 2 hours of fabrication). However, capacity on the intermediate voltage plateau (e.g., 1.2-1.4 V) thought to be related to reduction of $Ag^+$ to $Ag^0$ was undiminished relative to that of cells discharged within 2 hours of fabrication.

In the case of cells of Comparative Example 1 having cathodes containing soluble meta-sodium bismuthate, nearly all the capacity on the upper voltage plateau (e.g., 1.5 V) was absent when cells were discharged after 24 hours storage at room temperature. When the cells were discharged fresh (i.e., within 2 hours of fabrication), the capacity on the upper voltage plateau was somewhat diminished. However, the total low rate capacity to a 0.6 V cutoff voltage still was nearly 75 percent of the theoretical value.

Cells of Comparative Example 2 having cathodes containing bismuth tetroxide with an average bismuth oxidation state of +4 also had negligible capacity on the upper voltage plateau after 24 hours storage at room temperature. However, total capacity to a 0.6 V cutoff voltage still was equal to at least 75 percent of the theoretical value.

Cells of Comparative Example 3 having cathodes containing bismuth sesquioxide (i.e., not containing any $Bi^{5+}$) did not exhibit an upper voltage plateau when discharged. The high and low rate capacities to a 0.6 V cutoff voltage on the single voltage plateau were about 70 percent of the theoretical values.

From the above Examples and Comparative Examples, it is believed that for an alkaline cell having a gelled zinc anode, and a cathode containing a pentavalent bismuth-containing metal oxide with to have volumetric specific capacity of greater than about 0.8, 1.5, or 2.0 Ah/cm$^3$ (i.e., a gravimetric specific capacity of greater than about 100, 150, 200 mAh/g) for the cathode active material and an average running voltage for the cell of from about 1.4-1.7 V, the bismuth is preferably, predominantly pentavalent and the metal oxide is preferably, substantially insoluble in the alkaline electrolyte at room temperature. The cathode materials of Examples 1, 2, and 5 exhibit all of these characteristics. The cathode materials of Examples 3 and 4 5 are all partly soluble and thus some of the soluble $Bi^{5+}$ species can undergo self-discharge via oxidation of water resulting in oxygen evolution and formation of soluble $BiO_2^-$ ions. As a result, the specific capacity on the upper voltage plateau was decreased. The cathode materials of Comparative Examples 1 and 2 are readily soluble in alkaline electrolyte and can undergo extensive self-discharge when stored at room temperature. The cathode material of Comparative Example 3 does not contain any $Bi^{5+}$ and thus does not have a voltage plateau above about 0.8 V.

All references, such as patent applications, publications, and patents, referred to herein are incorporated by reference in their entirety.

Other embodiments are in the claims.

What is claimed is:

1. A primary battery, comprising:
   a cathode comprising
      an oxide containing an alkali metal and pentavalent bismuth, the alkali metal being lithium or potassium, and an electrochemically active cathode material different from the oxide;
an anode;
a separator between the cathode and the anode; and
an alkaline electrolyte.

2. The battery of claim 1, wherein the oxide comprises a material selected from the group consisting of $MBiO_3$, $M_3BiO_4$, $M_7BiO_6$, $M_4Bi_2O_7$, and $M_5Bi_3O_{10}$, where M is Li or K.

3. The battery of claim 1, wherein the oxide comprises an electrically conductive portion.

4. The battery of claim 3, wherein the electrically conductive portion is an electrically conductive surface coating comprising carbon or a metal oxide.

5. The battery of claim 4, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

6. The battery of claim 1, wherein the anode comprises zinc.

7. The battery of claim 1, wherein the electrolyte comprises lithium hydroxide, sodium hydroxide, or potassium hydroxide.

8. The battery of claim 1, wherein the separator is capable of preventing soluble bismuth species from diffusing from the cathode to the anode.

9. A primary battery, comprising:
a cathode comprising
an oxide containing an alkaline earth metal and pentavalent bismuth, and
an electrochemically active cathode material different from the oxide;
an anode;
a separator between the cathode and the anode; and
an alkaline electrolyte.

10. The battery of claim 9, wherein the alkaline earth metal is selected from the group consisting of magnesium, calcium, strontium, and barium.

11. The battery of claim 9, wherein the oxide comprises a material selected from the group consisting of $MgBi_2O_6$, $SrBi_2O_6$, $Sr_2Bi_2O_7$, $LiSr_3BiO_6$, $NaSr_3BiO_6$, $(Ba,K)BiO_3$, $(Sr,K)BiO_3$, $Li_2Ba_5Bi_2O_{11}$, and $Ba_2Bi_2O_6$.

12. The battery of claim 9, wherein the oxide comprises an electrically conductive portion.

13. The battery of claim 12, wherein the electrically conductive portion is an electrically conductive surface coating comprising carbon or a metal oxide.

14. The battery of claim 13, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

15. The battery of claim 9, wherein the oxide comprises cobalt oxyhydroxide and $MgBi_2O_6$.

16. The battery of claim 9, wherein the anode comprises zinc.

17. The battery of claim 9, wherein the electrolyte comprises lithium hydroxide, sodium hydroxide, or potassium hydroxide.

18. The battery of claim 9, wherein the oxide further comprises an alkali metal.

19. The battery of claim 9, wherein the separator is capable of preventing soluble bismuth species from diffusing from the cathode to the anode.

20. A primary battery, comprising:
a cathode comprising
an oxide containing a metal and pentavalent bismuth, the metal being a main group metal or a transition metal, other than silver, and
an electrochemically active cathode material different from the oxide;
an anode;
a separator between the cathode and the anode; and
an alkaline electrolyte.

21. The battery of claim 20, wherein the transition metal is selected from the group consisting of scandium, vanadium, manganese, iron, cobalt, nickel, copper, zinc, yttrium, zirconium, niobium, molybdenum, ruthenium, palladium, cadmium, tantalum, and tungsten.

22. The battery of claim 20, wherein the transition metal is a lanthanide selected from the group consisting of lanthanum, cerium, praseodymium, neodymium, samarium, europium, gadolinium, terbium, dysprosium, holmium, erbium, thulium, and ytterbium.

23. The battery of claim 20, wherein the metal is selected from the group consisting of indium, tin, antimony, and lead.

24. The battery of claim 20, wherein the oxide further comprises an alkali metal or an alkaline earth metal.

25. The battery of claim 20, wherein the oxide comprises a material selected from the group consisting of $ZnBi_2O_6$, $Cu_2Bi_2O_7$, $CdBi_2O_6$, $Ba_2YBiO_6$, $Ba_2LaBiO_6$, $Sr_2NdBiO_6$, $Ba_2InBiO_6$, $Ba(Bi,Pb)O_3$, $Sr_{18}Ru_{1.9}Bi_{4.1}O_{33}$, $Li_8PdBi_2O_{10}$, and $Sr_2ScBiO_6$.

26. The battery of claim 20, wherein the oxide comprises an electrically conductive portion.

27. The battery of claim 26, wherein the electrically conductive portion is an electrically conductive surface coating comprising carbon or a metal oxide.

28. The battery of claim 27, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

29. The battery of claim 20, wherein the oxide comprises cobalt oxyhydroxide and $ZnBi_2O_6$.

30. The battery of claim 20, wherein the anode comprises zinc.

31. The battery of claim 20, wherein the electrolyte comprises lithium hydroxide, sodium hydroxide, or potassium hydroxide.

32. The battery of claim 20, wherein the separator is capable of preventing soluble bismuth species from diffusing from the cathode to the anode.

33. The battery of claim 1, wherein the electrochemically active cathode material is selected from the group consisting of manganese dioxide, nickel oxyhydroxide, AgO, $AgNiO_2$, and $AgCoO_2$.

34. The battery of claim 1, wherein the electrochemically active cathode material comprises manganese dioxide.

35. The battery of claim 1, wherein the electrochemically active cathode material comprises nickel oxyhydroxide.

36. The battery of claim 9, wherein the electrochemically active cathode material is selected from the group consisting of manganese dioxide, nickel oxyhydroxide, AgO, $AgNiO_2$, and $AgCoO_2$.

37. The battery of claim 9, wherein the electrochemically active cathode material comprises manganese dioxide.

38. The battery of claim 9, wherein the electrochemically active cathode material comprises nickel oxyhydroxide.

39. The battery of claim 9, wherein the oxide comprises $MgBi_2O_6$, and the electrochemically active cathode material comprises nickel oxyhydroxide.

40. The battery of claim 20, wherein the electrochemically active cathode material is selected from the group consisting of manganese dioxide, nickel oxyhydroxide, AgO, $AgNiO_2$, and $AgCoO_2$.

41. The battery of claim 20, wherein the electrochemically active cathode material comprises manganese dioxide.

42. The battery of claim 20, wherein the electrochemically active cathode material comprises nickel oxyhydroxide.

43. A primary battery, comprising:
a cathode comprising $AgBiO_3$ and at least 50% by weight of a second cathode active material selected from the group consisting of manganese dioxide and nickel oxyhydroxide;
an anode;
a separator between the cathode and the anode; and
an alkaline electrolyte.

44. The battery of claim 43, wherein the $AgBiO_3$ comprises an electrically conductive portion.

45. The battery of claim 44, wherein the electrically conductive portion is an electrically conductive surface coating comprising carbon or a metal oxide.

46. The battery of claim 45, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

47. The battery of claim 43, wherein the anode comprises zinc.

48. A primary battery, comprising:
a cathode comprising
at least 30% of $AgBiO_3$ by weight, and
an electrochemically active cathode material different from $AgBiO_3$;
an anode;
a separator between the cathode and the anode; and
an alkaline electrolyte.

49. The battery of claim 48, wherein the $AgBiO_3$ comprises an electrically conductive portion.

50. The battery of claim 49, wherein the electrically conductive portion is an electrically conductive surface coating comprising carbon or a metal oxide.

51. The battery of claim 50, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

52. The battery of claim 20, wherein the anode comprises zinc.

53. The battery of claim 48, wherein the cathode comprises at least 40% of $AgBiO_3$ by weight.

* * * * *